United States Patent
Cam et al.

(10) Patent No.: US 11,793,606 B2
(45) Date of Patent: Oct. 24, 2023

(54) DEVICES, SYSTEMS, AND METHODS FOR DENTAL ARCH EXPANSION

(71) Applicant: ALIGN TECHNOLOGY, INC., San Jose, CA (US)

(72) Inventors: Bruce Cam, San Jose, CA (US); Peter Webber, Redwood City, CA (US); Yuxiang Wang, San Jose, CA (US); Jun Sato, San Jose, CA (US); Jeeyoung Choi, Sunnyvale, CA (US)

(73) Assignee: Align Technology, Inc., San Jose, CA (US)

( * ) Notice: Subject to any disclaimer, the term of this patent is extended or adjusted under 35 U.S.C. 154(b) by 622 days.

(21) Appl. No.: 16/022,552

(22) Filed: Jun. 28, 2018

(65) Prior Publication Data

US 2019/0000593 A1    Jan. 3, 2019

Related U.S. Application Data

(60) Provisional application No. 62/527,467, filed on Jun. 30, 2017.

(51) Int. Cl.
*A61C 7/10*    (2006.01)
*A61C 5/00*    (2017.01)
(Continued)

(52) U.S. Cl.
CPC .............. *A61C 7/10* (2013.01); *A61C 5/007* (2013.01); *A61C 7/08* (2013.01); *A61C 7/282* (2013.01); *A61C 7/002* (2013.01); *A61C 7/145* (2013.01); *A61C 7/20* (2013.01); *A61C 7/30* (2013.01); *A61C 2007/004* (2013.01)

(58) Field of Classification Search
CPC ............. A61C 7/10; A61C 7/002; A61C 7/08; A61C 7/20; A61C 7/30; A61C 7/145; A61C 5/007; A61C 2007/004
See application file for complete search history.

(56) References Cited

U.S. PATENT DOCUMENTS

| 2,467,432 A | 4/1949 | Kesling |
| 3,407,500 A | 10/1968 | Kesling |

(Continued)

FOREIGN PATENT DOCUMENTS

| AU | 3031677 A | 5/1979 |
| AU | 517102 B2 | 7/1981 |

(Continued)

OTHER PUBLICATIONS

International search report with written opinion dated Oct. 17, 2018 for PCT/US2018/040424.

(Continued)

*Primary Examiner* — Edward Moran
*Assistant Examiner* — Matthew P Saunders
(74) *Attorney, Agent, or Firm* — Shay Glenn LLP

(57) ABSTRACT

Methods and systems are provided for generating a treatment plan for arch expansion where a polymeric shell appliance is utilized to generate one or more activation forces that facilitate tooth movement. The polymeric shell appliances may comprise one or more tooth receiving cavities, in which each of the plurality of tooth receiving cavities is shaped and arranged to provide a counter moment of each of the plurality of teeth.

21 Claims, 24 Drawing Sheets

(51) Int. Cl.
  *A61C 7/08*  (2006.01)
  *A61C 7/00*  (2006.01)
  *A61C 7/28*  (2006.01)
  *A61C 7/14*  (2006.01)
  *A61C 7/20*  (2006.01)
  *A61C 7/30*  (2006.01)

(56) References Cited

U.S. PATENT DOCUMENTS

| | | |
|---|---|---|
| 3,600,808 A | 8/1971 | James |
| 3,660,900 A | 5/1972 | Lawrence |
| 3,683,502 A | 8/1972 | Melvin |
| 3,738,005 A | 6/1973 | Cohen et al. |
| 3,860,803 A | 1/1975 | Levine |
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling |
| 4,253,828 A | 3/1981 | Coles et al. |
| 4,324,546 A | 4/1982 | Heitlinger et al. |
| 4,324,547 A | 4/1982 | Arcan et al. |
| 4,348,178 A | 9/1982 | Kurz |
| 4,478,580 A | 10/1984 | Barrut |
| 4,500,294 A | 2/1985 | Lewis |
| 4,504,225 A | 3/1985 | Yoshii |
| 4,505,673 A | 3/1985 | Yoshii |
| 4,526,540 A | 7/1985 | Dellinger |
| 4,575,330 A | 3/1986 | Hull |
| 4,575,805 A | 3/1986 | Moermann et al. |
| 4,591,341 A | 5/1986 | Andrews |
| 4,609,349 A | 9/1986 | Cain |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling |
| 4,676,747 A | 6/1987 | Kesling |
| 4,742,464 A | 5/1988 | Duret et al. |
| 4,755,139 A | 7/1988 | Abbatte et al. |
| 4,763,791 A | 8/1988 | Halverson et al. |
| 4,793,803 A * | 12/1988 | Martz ...................... A61C 7/08 433/6 |
| 4,798,534 A | 1/1989 | Breads |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,889,238 A | 12/1989 | Batchelor |
| 4,890,608 A | 1/1990 | Steer |
| 4,935,635 A | 6/1990 | O'Harra |
| 4,936,862 A | 6/1990 | Walker et al. |
| 4,937,928 A | 7/1990 | Van Der Zel |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell |
| 5,011,405 A | 4/1991 | Lemchen |
| 5,017,133 A | 5/1991 | Miura |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,100,316 A | 3/1992 | Wildman |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,184,306 A | 2/1993 | Erdman et al. |
| 5,186,623 A | 2/1993 | Breads et al. |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson |
| 5,342,202 A | 8/1994 | Deshayes |
| 5,368,478 A | 11/1994 | Andreiko et al. |
| 5,382,164 A | 1/1995 | Stern |
| 5,395,238 A | 3/1995 | Andreiko et al. |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. |
| 5,621,648 A | 4/1997 | Crump |
| 5,645,420 A | 7/1997 | Bergersen |
| 5,645,421 A | 7/1997 | Slootsky |
| 5,655,653 A | 8/1997 | Chester |
| 5,683,243 A | 11/1997 | Andreiko et al. |
| 5,692,894 A | 12/1997 | Schwartz et al. |
| 5,725,376 A | 3/1998 | Poirier |
| 5,725,378 A | 3/1998 | Wang |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson |
| 5,823,778 A | 10/1998 | Schmitt et al. |
| 5,848,115 A | 12/1998 | Little et al. |
| 5,857,853 A | 1/1999 | Van et al. |
| 5,866,058 A | 2/1999 | Batchelder et al. |
| 5,879,158 A | 3/1999 | Doyle et al. |
| 5,880,961 A | 3/1999 | Crump |
| 5,880,962 A | 3/1999 | Andersson et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda |
| 6,049,743 A | 4/2000 | Baba |
| 6,062,861 A | 5/2000 | Andersson |
| 6,068,482 A | 5/2000 | Snow |
| 6,099,314 A | 8/2000 | Kopelman et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,217,325 B1 | 4/2001 | Chishti et al. |
| 6,217,334 B1 | 4/2001 | Hultgren |
| 6,244,861 B1 | 6/2001 | Andreiko et al. |
| 6,309,215 B1 | 10/2001 | Phan et al. |
| 6,315,553 B1 | 11/2001 | Sachdeva et al. |
| 6,322,359 B1 | 11/2001 | Jordan et al. |
| 6,350,120 B1 | 2/2002 | Sachdeva et al. |
| 6,382,975 B1 | 5/2002 | Poirier |
| 6,398,548 B1 | 6/2002 | Muhammad et al. |
| 6,402,707 B1 | 6/2002 | Ernst |
| 6,450,807 B1 | 9/2002 | Chishti et al. |
| 6,482,298 B1 | 11/2002 | Bhatnagar |

(56) References Cited

U.S. PATENT DOCUMENTS

| | | | |
|---|---|---|---|
| 6,524,101 | B1 | 2/2003 | Phan et al. |
| 6,554,611 | B2 | 4/2003 | Shishti et al. |
| 6,572,372 | B1 | 6/2003 | Phan et al. |
| 6,629,840 | B2 | 10/2003 | Chishti et al. |
| 6,705,863 | B2 | 3/2004 | Phan et al. |
| 6,722,880 | B2 | 4/2004 | Chishti et al. |
| 6,749,414 | B1 | 6/2004 | Hanson et al. |
| 6,830,450 | B2 | 12/2004 | Knopp et al. |
| 7,192,273 | B2 * | 3/2007 | McSurdy, Jr. ........... A61C 7/10 433/24 |
| 7,892,474 | B2 | 2/2011 | Shkolnik et al. |
| 9,161,823 | B2 * | 10/2015 | Morton .................. G06F 30/00 |
| 2002/0006597 | A1 | 1/2002 | Andreiko et al. |
| 2003/0009252 | A1 | 1/2003 | Pavlovskaia et al. |
| 2003/0139834 | A1 | 7/2003 | Nikolskiy et al. |
| 2003/0224311 | A1 | 12/2003 | Cronauer |
| 2004/0128010 | A1 | 7/2004 | Pavlovskaia et al. |
| 2004/0209218 | A1 * | 10/2004 | Chishti .................... A61C 7/36 433/7 |
| 2005/0055118 | A1 | 3/2005 | Nikolskiy et al. |
| 2006/0099546 | A1 * | 5/2006 | Bergersen ............... A61C 7/10 433/6 |
| 2006/0177789 | A1 * | 8/2006 | O'Bryan ................. A61C 7/08 433/18 |
| 2006/0223022 | A1 * | 10/2006 | Solomon ................. A61C 7/08 433/6 |
| 2008/0233529 | A1 * | 9/2008 | Kuo ........................ A61C 7/08 433/6 |
| 2009/0191502 | A1 * | 7/2009 | Cao ......................... A61C 7/08 433/24 |
| 2011/0247214 | A1 * | 10/2011 | Huge ....................... A61C 7/08 29/896.11 |
| 2013/0204583 | A1 * | 8/2013 | Matov .................... A61C 19/04 703/1 |
| 2014/0061974 | A1 | 3/2014 | Tyler et al. |
| 2014/0265034 | A1 | 9/2014 | Dudley |
| 2015/0097315 | A1 | 4/2015 | Desimone et al. |
| 2015/0097316 | A1 | 4/2015 | Desimone et al. |
| 2015/0102532 | A1 | 4/2015 | Desimone et al. |
| 2015/0157421 | A1 * | 6/2015 | Martz ...................... A61C 7/08 433/6 |
| 2015/0238284 | A1 * | 8/2015 | Wu ......................... A61C 7/002 433/19 |
| 2016/0081768 | A1 * | 3/2016 | Kopelman ............... A61C 7/10 433/6 |
| 2016/0081769 | A1 * | 3/2016 | Kimura .................. A61C 7/002 433/6 |
| 2016/0193014 | A1 * | 7/2016 | Morton .................. A61C 7/002 433/6 |
| 2016/0199216 | A1 * | 7/2016 | Cam ....................... A61C 7/002 128/848 |
| 2017/0007365 | A1 * | 1/2017 | Kopelman ............... A61C 7/08 |
| 2017/0007367 | A1 * | 1/2017 | Li ........................... B44C 1/227 |
| 2017/0100215 | A1 * | 4/2017 | Khouri .................. A61C 8/0096 |
| 2017/0304108 | A1 * | 10/2017 | Simonetti ............... A61F 5/566 |
| 2018/0153649 | A1 * | 6/2018 | Wu ......................... G16H 50/50 |
| 2018/0168776 | A1 * | 6/2018 | Webber .................... A61C 7/08 |
| 2019/0000592 | A1 * | 1/2019 | Cam ....................... A63B 71/085 |
| 2019/0021817 | A1 * | 1/2019 | Sato ........................ A61C 7/14 |

FOREIGN PATENT DOCUMENTS

| | | |
|---|---|---|
| AU | 5598894 A | 6/1994 |
| CA | 1121955 A | 4/1982 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-2006052414 A2 | 5/2006 |
| WO | WO-2017006176 A1 | 1/2017 |
| WO | WO-2017007964 A1 | 1/2017 |
| WO | WO-2019006386 A1 | 1/2019 |

OTHER PUBLICATIONS

AADR. American Association for Dental Research, Summary of Activities, Mar. 20-23, 1980, Los Angeles, CA, p. 195.

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapters, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

Bernard et al., "Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.

(56) References Cited

OTHER PUBLICATIONS

Bhatia et al., "A Computer-Aided Design for Orthognathic Surgery," Br. J. Oral Maxillofac. Surg., 22:237-253 (1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Opeation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/—pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at< http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret —A Man with a Vision,"Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/Universify of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CaAM 'DCS Titan System' for Production of Crowns/Bridges," DSC Production AG, pp. 1-7 (Jan. 1992).

Definition for gingiva. Dictionary.com p. 1-3. Retrieved from the internet Nov. 5, 2004<http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances-Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet:<http://wscg.zcu.cz/wscg98/papers98/Strasser98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
GIM-ALLDENT Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management, "J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.eom/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).

(56) References Cited

OTHER PUBLICATIONS

Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances-Pro Lab, 1 page 1998).
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.
Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11 -29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984).
KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
McCann, "Inside the ADA," J. Amer. Dent. Assoc., 118:286-294 (Mar. 1989).
McNamara et al., "Invisible Retainers," J. Cfin. Orthod., pp. 570-578 (Aug. 1985).
McNamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).

Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf, of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993).
Raintree Essix & Ars Materials, Inc., Raintree Essix, Technical Magazine Table of contents and Essix Appliances,< http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolampl. Head NeckSur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in derZahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.0X (in French), 2003, 114 pages total.

(56) References Cited

OTHER PUBLICATIONS

Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No Braces Treatment, Allesee HI Orthodontic Appliances-Pro Lab product information for doctors. http://ormco.com/aoa/appliancesservices/RWB/doctorhtml>, 5 pages (May 19, 2003).
The Choice is Clear: Red, White & Blue . . . The Simple, Affordable, No Braces Treatment, Allesee HJ Orthodontic Appliances-Pro Lab product information for patients,< http://ormco.com/aoa/appliancesservices/RWB/patients.html>, 2 pages (May 19, 2003).
The Choice Is Clear: Red, White & Blue . . . The Simple, Affordable, No Braces Treatment, Allesee Orthodontic Appliances-Pro Lab product information, 6 pages (2003).
The Red, White & Blue Way to Improve Your Smile! Allesee Orthodontic Appliances-Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11)769-778 (1993.
Varady et al., "Reverse Engineering Of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxiiofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf, of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances-Pro Lab product information for patients, 2 pages (2002).

\* cited by examiner

DEVICES, SYSTEMS, AND METHODS FOR DENTAL ARCH EXPANSION

CROSS-REFERENCE

This application claims the benefit of U.S. Provisional Application No. 62/527,467, filed Jun. 30, 2017, which application is incorporated herein by reference.

BACKGROUND OF THE INVENTION

Treatment methods of primary and permanent teeth can be different due to the varying tooth anatomy of primary and permanent teeth. As primary teeth exfoliate, the roots are resorbed by the erupting permanent teeth. Additionally, the arch is oftentimes expanded in order to create space for erupting canines or other permanent teeth. Extracting or exfoliating teeth can alter an alignment treatment plan and create issues with applying the expansion force to a reduced number of teeth.

SUMMARY

An orthodontic appliance for moving a tooth of a patient from a first position and orientation to a second position and orientation is disclosed. The orthodontic appliance may include a polymeric shell shaped to fit over an arch of a patient's teeth. The polymeric shell may include a plurality of teeth receiving cavities comprising a lingual wall, a buccal wall, an occlusal wall extending between and connecting the lingual wall, and the buccal wall. The polymeric shell may be shaped to impart an arch expansion force onto a first of the one or more teeth of the patient to move the one or more teeth of a patient from a first location a first distance from a midline of the arch of the patient to a second position a second distance from midline of the arch of the patient, the second distance being greater than the first distance. In some embodiments, the polymeric shell is shaped to impart anti-tipping force onto the first of the one or more teeth, the anti-tipping moment being of a magnitude and direction to counteract a tipping movement of the arch expansion force.

A lingual bar may be located on a lingual surface the lingual wall of the polymeric shell and may extend from a first tooth receiving cavity, across the midline of the arch, to a second tooth receiving cavity, the lingual bar may be shaped to exert an arch expansion force on the teeth of the patient.

The lingual bar may be embedded in the lingual wall of the polymeric shell. In some embodiments, the lingual bar may extend from a first canine tooth receiving cavity, across the midline of the arch, to a second canine tooth receiving cavity.

The appliance may also include an arch feature located on a lingual surface of a lingual wall of a tooth receiving cavity. The arch feature may extend from the lingual surface in a occlusal direction and having an occlusal surface configured to contact an occlusal surface of an opposing arch feature located on an opposing orthodontic appliance shaped to fit over an opposing arch of the patient.

The occlusal surface of the arch feature may extend in the occlusal direction beyond an occlusal plane of the polymeric shell. In some embodiments, the arch feature may extend in the occlusal direction beyond an occlusal plane of the polymeric shell. In some embodiments, the arch feature extends in the occlusal direction to an occlusal plane of the polymeric shell.

In some embodiments, the arch feature is integrally formed with the polymeric shell. In some embodiments, the feature is coupled to the polymeric shell.

An orthodontic appliance for moving a tooth of a patient from a first position and orientation to a second position and orientation is disclosed. The orthodontic appliance may include a polymeric shell shaped to fit over an arch of a patient's teeth and including a plurality of teeth receiving cavities comprising a lingual wall, a buccal wall, an occlusal wall extending between and connecting the lingual wall and the buccal wall. The polymeric shell may be shaped to impart an arch expansion force onto a first of the one or more teeth of the patient to move the one or more teeth of a patient from a first location a first distance from a midline of the arch of the patient to a second position a second distance from midline of the arch of the patient, the second distance being greater than the first distance. An occlusal feature may be located on an occlusal surface of a occlusal wall of a tooth receiving cavity. The occlusal feature may extend from the occlusal surface in a occlusal direction and may be configured to contact an occlusal surface of an opposing orthodontic appliance shaped to fit over an opposing arch of the patient. The occlusal feature may be shaped to impart anti-tipping force onto the first of the one or more teeth. The anti-tipping moment may be of a magnitude and direction to counteract a tipping movement of the arch expansion force.

In some embodiments, the occlusal feature may be integrally formed with the polymeric shell. In some embodiments, the occlusal feature may be coupled to the polymeric shell. In some embodiments, a height of the occlusal feature above the occlusal surface of the tooth receiving cavity may be less than 0.5 mm. In some embodiments, a height of the occlusal feature above the occlusal surface of the tooth receiving cavity may be between about 0.5 mm and about 1.5 mm.

An orthodontic appliance for moving a tooth of a patient from a first position and orientation to a second position and orientation is also disclosed. The orthodontic appliance may include a polymeric shell shaped to fit over an arch of a patient's teeth and including a plurality of teeth receiving cavities comprising a lingual wall, a buccal wall, an occlusal wall extending between and connecting the lingual wall and the buccal wall. The polymeric shell may be shaped to impart an arch expansion force onto a first of the one or more teeth of the patient to move the one or more teeth of a patient from a first location a first distance from a midline of the arch of the patient to a second position a second distance from midline of the arch of the patient. The second distance may be greater than the first distance. At least one of the tooth receiving cavities may include a tooth facing surface of the occlusal wall shaped to impart an anti-tipping moment onto an occlusal cusp of the one or more teeth. The anti-tipping moment may be of a magnitude and direction to counteract a tipping movement of the arch expansion force.

In some embodiments, tooth facing surface may be shaped to interfere with an occlusal cusp of the one or more teeth. In some embodiments, tooth facing surface may be shaped to interfere with a plurality of occlusal cusps of the one or more teeth.

A system for moving a tooth of a patient from a first position and orientation to a second position and orientation is disclosed. The orthodontic appliance may include a polymeric shell shaped to fit over an arch of a patient's teeth and including a plurality of teeth receiving cavities comprising a lingual wall, a buccal wall, an occlusal wall extending between and connecting the lingual wall and the buccal wall. The polymeric shell may be shaped to impart an arch expansion force onto a first of the one or more teeth of the patient to move the one or more teeth of a patient from a first location a first distance from a midline of the arch of the patient to a second position a second distance from midline of the arch of the patient, the second distance being greater than the first distance. A first occlusal feature may be located on an occlusal surface of an occlusal wall of a tooth receiving cavity of the first polymeric shell appliance. The occlusal feature may extend from the occlusal surface in a occlusal direction and configured to contact an opposing polymeric shell and to impart anti-tipping force onto the first of the one or more teeth, the anti-tipping moment being in a direction to counteract a tipping movement of the arch expansion force. The opposing polymeric shell may be shaped to fit over an opposing arch of a patient's teeth and including a plurality of teeth receiving cavities comprising a lingual wall, a buccal wall, an occlusal wall extending between and connecting the lingual wall and the buccal wall. The opposing polymeric shell may be shaped to impart an arch expansion force onto a first of the one or more teeth of the patient to move the one or more teeth of a patient from a first location a first distance from a midline of the arch of the patient to a second position a second distance from midline of the arch of the patient, the second distance being greater than the first distance. A second occlusal feature may be located on an occlusal surface of a occlusal wall of a tooth receiving cavity of the opposing polymeric shell appliance. The second occlusal feature extending from the occlusal surface in a occlusal direction and configured to contact the first polymeric shell to impart anti-tipping force onto the second of the one or more teeth, the anti-tipping moment being in a direction to counteract a tipping movement of the arch expansion force.

In some embodiments, the first occlusal feature and the second occlusal feature contact each other upon natural closing of the jaw.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

The "arch" is one of two dental arches in humans and many other species. The upper arch is also known as the maxillary arch or the superior arch. The lower arch is also known as the mandibular arch or the inferior arch. When the jaw closes, the dental arches approach each other and the mouth occludes or closes.

The "corresponding engagement surface" of the one or more teeth in the opposing arch is the occlusal surface of one or more teeth in the opposing arch as determined by the natural closing of the jaw.

The "natural closing of the jaw" is the closing of the jaw wherein the least effort is exerted to move the jaw to a closed position.

As used herein the term "and/or" is used as a functional word to indicate that two words or expressions are to be taken together or individually. For example, A and/or B encompasses A alone, B alone, and A and B together.

As used herein a "moment" encompasses a force acting on an object such as a tooth at a distance from a center of resistance. The moment may be calculated with a vector cross product of a vector force applied to a location corresponding to a displacement vector from the center of resistance, for example. The moment may comprise a vector pointing in a direction. A moment opposing another moment may encompass one of the moment vectors oriented toward a first side of the object such as the tooth and the other moment vector oriented toward an opposite side of the object such as tooth, for example.

The counter moments as disclosed herein may be used to accurately control movement of one or more teeth and may be used to provide a counter tipping moment.

The moments and counter moments as disclosed herein are well suited for moving many types of teeth and conditions of teeth, and are well suited for use with many conditions of teeth. The embodiments disclosed herein can be used to treat en masse expansion of teeth along an arch, closure of an extraction site, intrusion, extrusion, rotation, tipping, and combinations thereof, for example.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

Figure 1A:
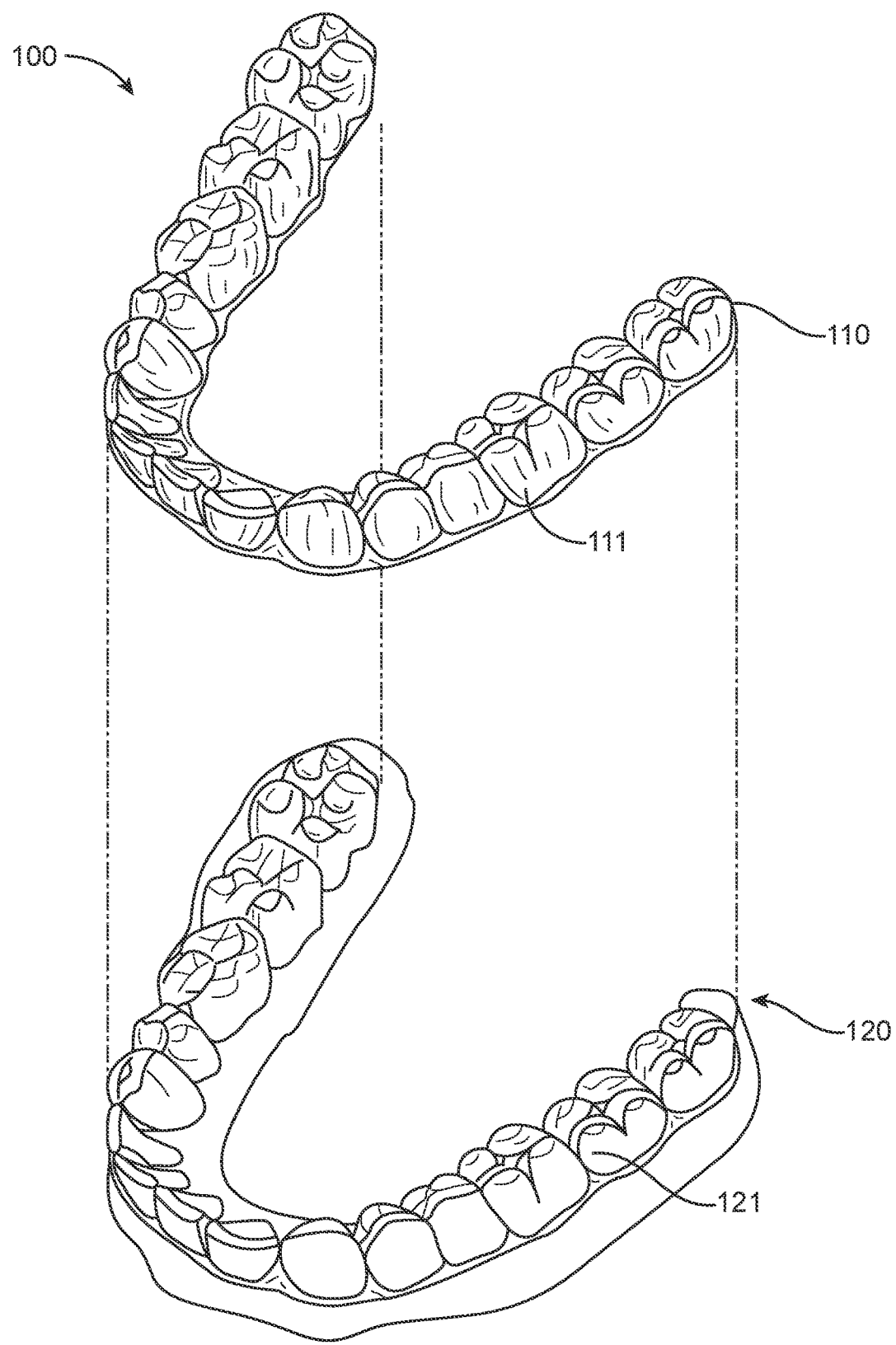
FIG. 1A illustrates a tooth repositioning appliance, in accordance with one or more embodiments herein.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 121 in the jaw. The appliance can include a shell 110 (e.g., a continuous polymeric shell or a segmented shell) having teeth-receiving cavities 111 that receive and resiliently reposition the teeth 121. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance may be repositioned by the appliance while other teeth can provide a base or anchor region for holding the appliance in place as it applies force against the tooth or teeth targeted for repositioning. In some cases, some or most, and even all, of the teeth may be repositioned at some point during treatment. Teeth that are moved can also serve as a base or anchor for holding the appliance as it is worn by the patient. Typically, no wires or other means may be provided for holding an appliance in place over the teeth. In some cases, however, it may be desirable or necessary to provide individual attachments or other aligner features for controlling force delivery and distribution Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. Additional examples of accessories include but are not limited to opposing arch features, occlusal features, torsional rigidity features, occlusal cusp, and bridges. In some embodiments, the appliances, systems and methods described herein include improved orthodontic appliances with integrally formed features that are shaped to couple to such auxiliary components, or that replace such auxiliary components.

Figure 1B:
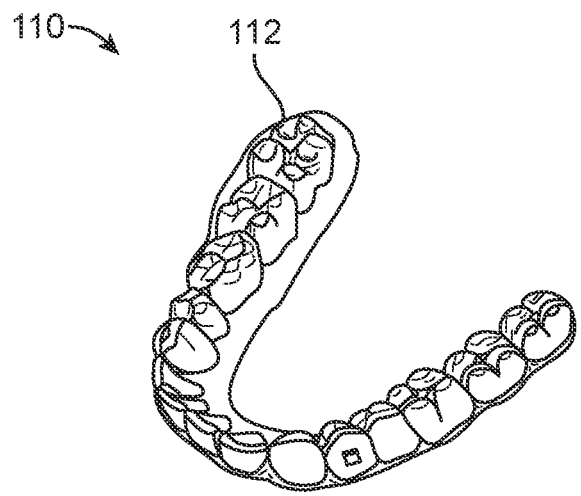
FIG. 1B illustrates a tooth repositioning system, in accordance with one or more embodiments herein.
Figure 1B:
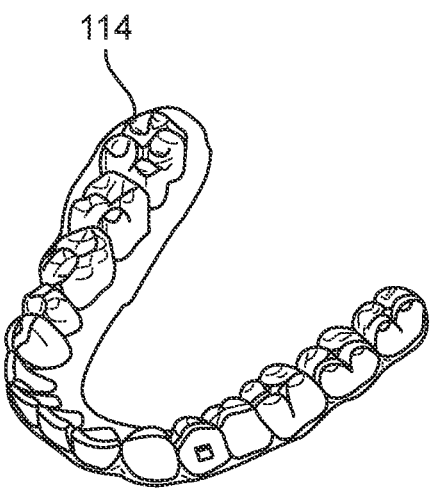
Figure 1B:
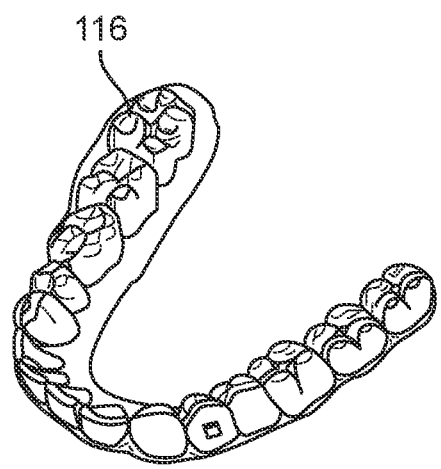

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement towards a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
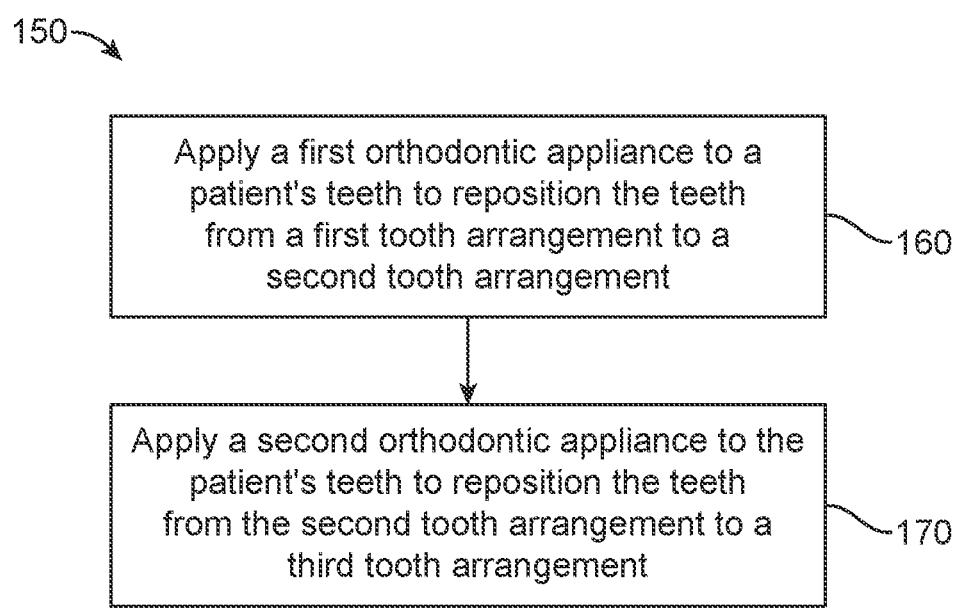
FIG. 1C illustrates a method of orthodontic treatment using a plurality of appliances, in accordance with one or more embodiments herein.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object's geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every nth build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although various embodiments herein are described with respect to direct fabrication techniques, it shall be appreciated that other techniques can also be used, such as indirect fabrication techniques. In some embodiments, the appliances herein (or portions thereof) can be produced using indirect fabrication techniques, such as by thermoforming over a positive or negative mold. Indirect fabrication of an orthodontic appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields, buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3-dimensional planning/design tools, such as Treat™ software from Align Technology, Inc., may be used to design and fabricate the orthodontic appliances described herein.

Figure 2:
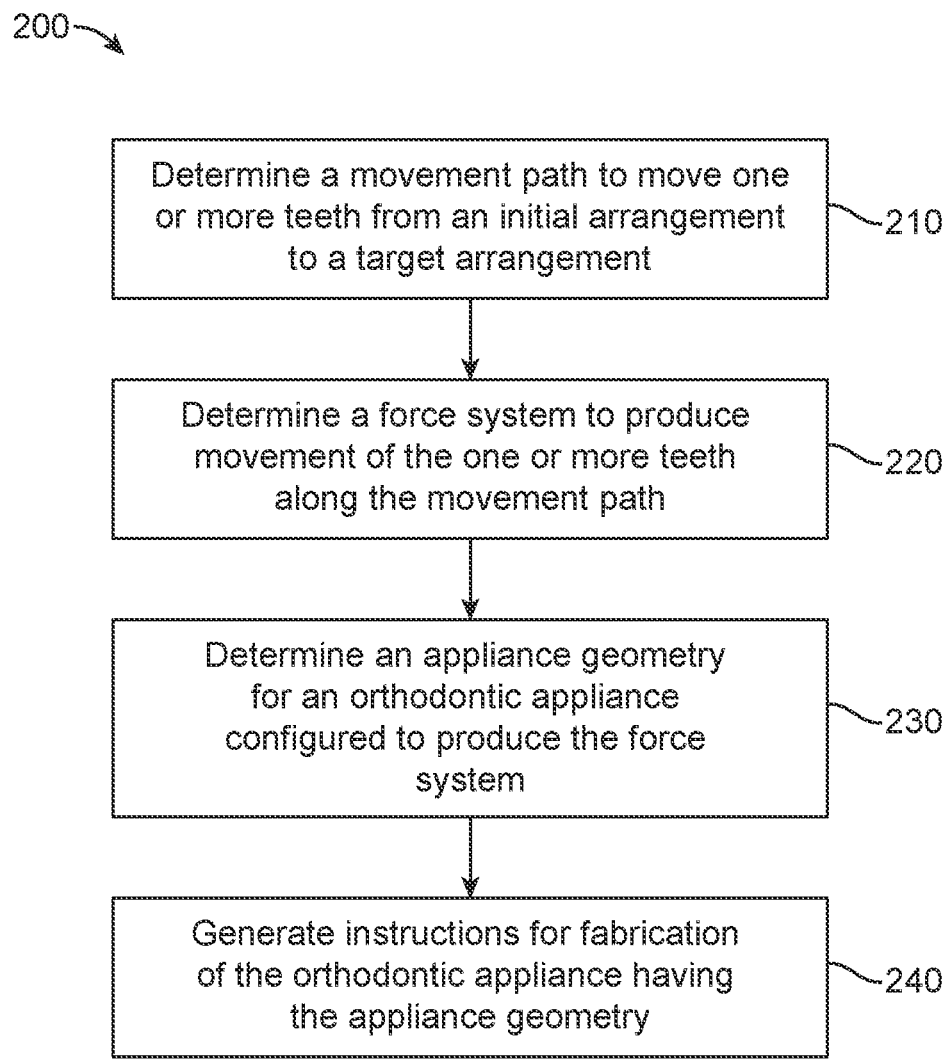
FIG. 2 illustrates a method for designing an orthodontic appliance, in accordance with one or more embodiments herein.

FIG. 2 illustrates a method 200 for designing an orthodontic appliance to be fabricated, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, step 220 can involve determining a particular type of force to be applied (e.g., extrusive force, intrusive force, translational force, rotational force, tipping force, torqueing force, etc.) without calculating the specific magnitude and/or direction of the force.

In step 230, an appliance geometry and/or material composition for an orthodontic appliance configured to produce the force system is determined. The appliance can be any embodiment of the appliances discussed herein, such as an appliance having variable localized properties, integrally formed components, and/or power arms.

For example, in some embodiments, the appliance comprises a heterogeneous thickness, a heterogeneous stiffness, or a heterogeneous material composition. In some embodiments, the appliance comprises two or more of a heterogeneous thickness, a heterogeneous stiffness, or a heterogeneous material composition. In some embodiments, the appliance comprises a heterogeneous thickness, a heterogeneous stiffness, and a heterogeneous material composition. The heterogeneous thickness, stiffness, and/or material composition can be configured to produce the force system for moving the teeth, e.g., by preferentially applying forces at certain locations on the teeth. For example, an appliance with heterogeneous thickness can include thicker portions that apply more force on the teeth than thinner portions. As another example, an appliance with heterogeneous stiffness can include stiffer portions that apply more force on the teeth than more elastic portions. Variations in stiffness can be achieved by varying the appliance thickness, material composition, and/or degree of photopolymerization, as described herein.

In some embodiments, determining the appliance geometry and/or material composition comprises determining the geometry and/or material composition of one or more integrally formed components to be directly fabricated with an appliance shell. The integrally formed component can be any of the embodiments described herein. The geometry and/or material composition of the integrally formed component(s) can be selected to facilitate application of the force system onto the patient's teeth. The material composition of the integrally formed component can be the same as or different from the material composition of the shell.

In some embodiments, determining the appliance geometry comprises determining the geometry for a customized aligner-teeth geometric interference.

The step 230 can involve analyzing the desired force system in order to determine an appliance geometry and material composition that would produce the force system. In some embodiments, the analysis involves determining appliance properties (e.g., stiffness) at one or more locations that would produce a desired force at the one or more locations. The analysis can then involve determining an appliance geometry and material composition at the one or more locations to achieve the specified properties. Determination of the appliance geometry and material composition can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA (Abaqus) software products from Dassault Systèmes of Waltham, Mass.

Optionally, one or more appliance geometries and material compositions can be selected for testing or force modeling. As noted above, a desired tooth movement, as well as a force system required or desired for eliciting the desired tooth movement, can be identified. Using the simulation environment, a candidate appliance geometry and composition can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, step 230 can further involve determining the geometry of one or more auxiliary components to be used in combination with the orthodontic appliance in order to exert the force system on the one or more teeth. Such auxiliaries can include one or more of tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components may be advantageous in situations where it is difficult for the appliance alone to produce the force system. Additionally, auxiliary components can be added to the orthodontic appliance in order to provide other desired functionalities besides producing the force system, such as mandibular advancement splints to treat sleep apnea, pontics to improve aesthetic appearance, and so on. In some embodiments, the auxiliary components are fabricated and provided separately from the orthodontic appliance. Alternatively, the geometry of the orthodontic appliance can be modified to include one or more auxiliary components as integrally formed components.

In step 240, instructions for fabrication of the orthodontic appliance having the appliance geometry and material composition are generated. The instructions can be configured to control a fabrication system or device in order to produce the orthodontic appliance with the specified appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.). Optionally, the instructions can be configured to cause a fabrication machine to directly fabricate the orthodontic appliance with teeth receiving cavities having shapes, positions, and features, as discussed herein. In alternative embodiments, the instructions can be configured for indirect fabrication of the appliance, e.g., by thermoforming.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired. For instance, in some embodiments, step 220 is optional, such that step 230 involves determining the appliance geometry and/or material composition based directly on the tooth movement path rather than based on the force system.

Figure 3:
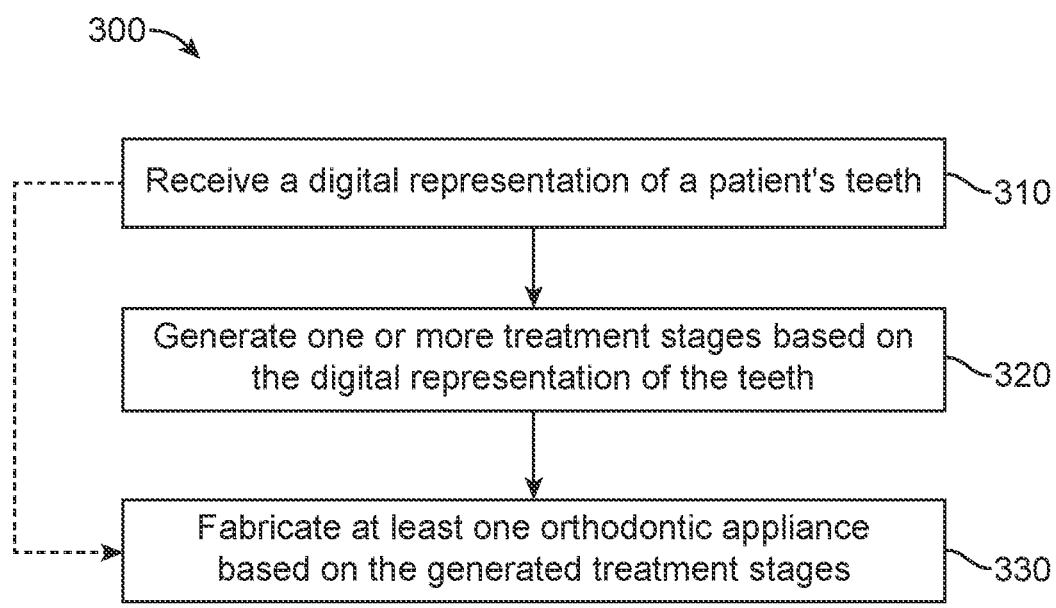
FIG. 3 illustrates a method for digitally planning an orthodontic treatment, in accordance with one or more embodiments herein.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Optionally, some or all of the steps of the method 300 are performed locally at the site where the patient is being treated and during a single patient visit, referred to herein as "chair side manufacturing." Chair side manufacturing can involve, for example, scanning the patient's teeth, automatically generating a treatment plan with treatment stages, and immediately fabricating one or more orthodontic appliance(s) to treat the patient using a chair side direct fabrication machine, all at the treating professional's office during a single appointment. In embodiments where a series of appliances are used to treat the patient, the first appliance may be produced chair side for immediate delivery to the patient, with the remaining appliances produced separately (e.g., off site at a lab or central manufacturing facility) and delivered at a later time (e.g., at a follow up appointment, mailed to the patient). Alternatively, the methods herein can accommodate production and immediate delivery of the entire series of appliances on site during a single visit. Chair side manufacturing can thus improve the convenience and speed of the treatment procedure by allowing the patient to immediately begin treatment at the practitioner's office, rather than having to wait for fabrication and delivery of the appliances at a later date. Additionally, chair side manufacturing can provide improved flexibility and efficiency of orthodontic treatment. For instance, in some embodiments, the patient is re-scanned at each appointment to determine the actual positions of the teeth, and the treatment plan is updated accordingly. Subsequently, new appliances can be immediately produced and delivered chair side to accommodate any changes to or deviations from the treatment plan.

Figure 4:
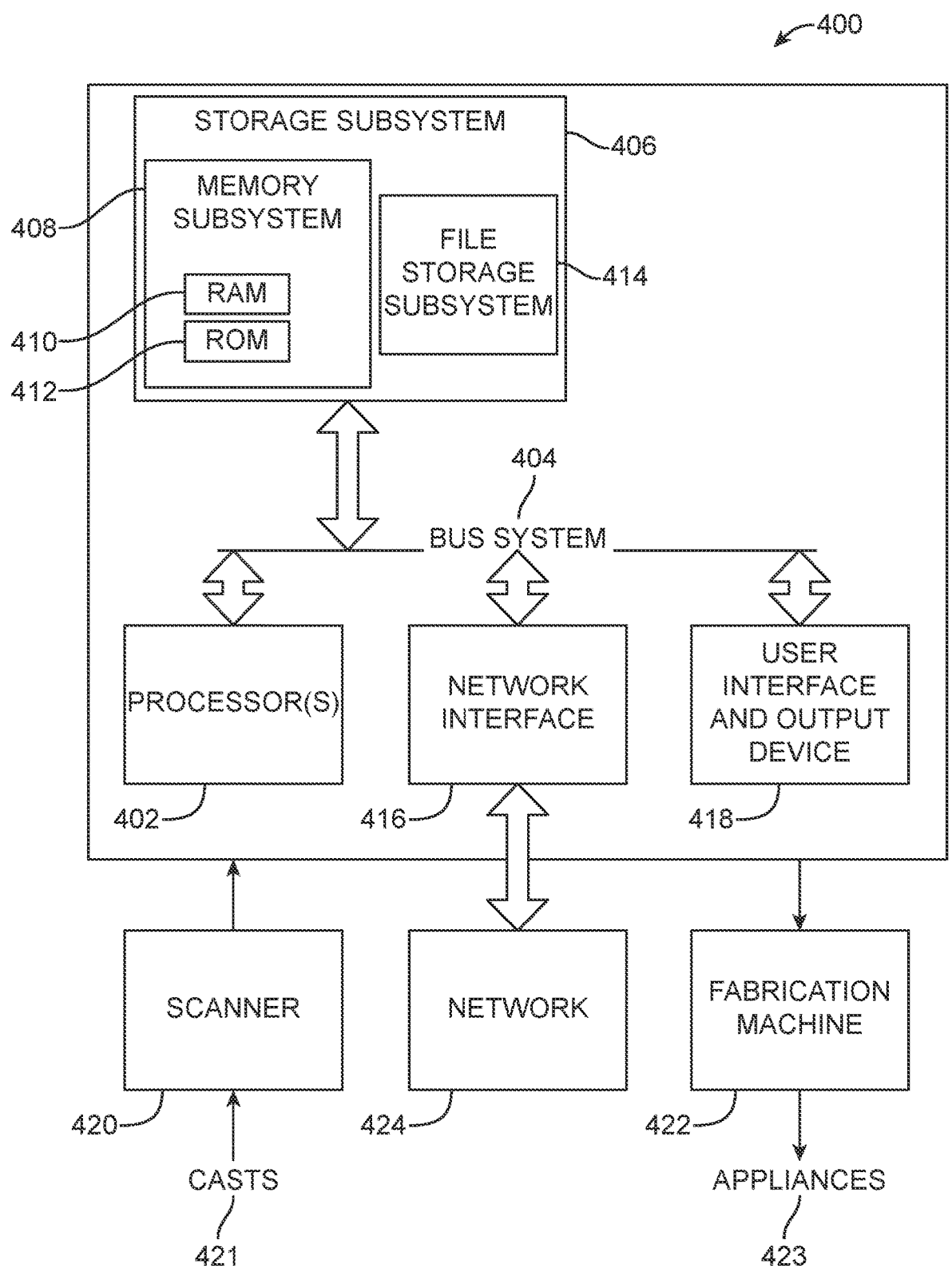
FIG. 4 is a simplified block diagram of a data processing system, in accordance with one or more embodiments herein.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It is recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor may receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Center of Resistance

The center of resistance influences the magnitude of tipping moment force generated by the polymeric shell appliance and the counter tipping moment force generated by the moment control features. The center of resistance is dependent on the tooth anatomy, which may be different for primary and permanent teeth. The size and position of the roots can influence the distribution of forces in the periodontium after the application of the orthodontic device.

The center of resistance of an individual tooth may be located near the bifurcation or trifurcation of the root of the tooth, for example. For a single rooted tooth, the center of resistance may be located somewhere between about 25% and about 70% of the distance from the alveolar crest to the apex of the root, for example about 40% of the distance.

The center of resistance of a group of a segment of teeth comprising a plurality of teeth may be determined in one or more of many ways. The center of resistance may be determined with finite element modeling, published values in the scientific literature, bench testing with experimental loads, mathematical formula and approximations, and combinations thereof, for example. The center of resistance may be determined in response to supporting dental structures such as the periodontal ligaments, soft tissue, and bony supporting structures, for example. Although the center of resistance of a group of teeth may change with the direction of movement, a person of ordinary skill in the art may determine the center of resistance in accordance with embodiments disclosed herein.

In order to accurately determine the distribution of forces of a primary tooth, a moment to force ratio is determined based on a model of the patient's teeth, including their crown and root structure. The combined calculation of moments and forces determines the type of movement the tooth undergoes when exposed to the forces of the orthodontic appliance. A typical moment to force ratio for bodily translation is 10:1. Exfoliating teeth have a smaller or receding root, and thus, this ratio may be adjusted based on the known length, such as based on x-rays of the patient's teeth, or a modeled length, such as based models based on common root lengths and shapes or predictive models based on predicted changes to a patient's root. Such predictions are particular helpful in aiding in determining force and moment systems in patient's with primary teeth.

Taking into account the changes in a patient's root structure over the course of treatment during the treatment planning process, such as shown and described with respect to FIGS. 1-4, can improve patient outcomes and reduce off track treatment corrections as compared to not predicting or modeling changes in root structures.

A root length model may take into account the current structure of a patient's tooth as an input. These inputs may include measurements or characterization of crown size, tooth age, x-rays, CT scan data, and other information, such as a digital model of the patient's teeth. The predicted length of a patient's root, along with its structure, may be used in determining the force and moment system at one or more points in time at one or more stages of treatment may be determined using the inputs discussed above along with models for root reabsorption of primary teeth.

At each stage of treatment, the center of resistance of one or more tooth, such as each primary tooth maybe determined based on the predicted root structure, including the root length. The force system may be determined using one or more of the updated center of resistance and predicted root structure.

In addition, the predicted root structure may be used to determine the placement and staging of features, such as attachments and other force imparting features, on the teeth and aligner.

Dental Expansion with Aligner Therapy

Figure 5A:
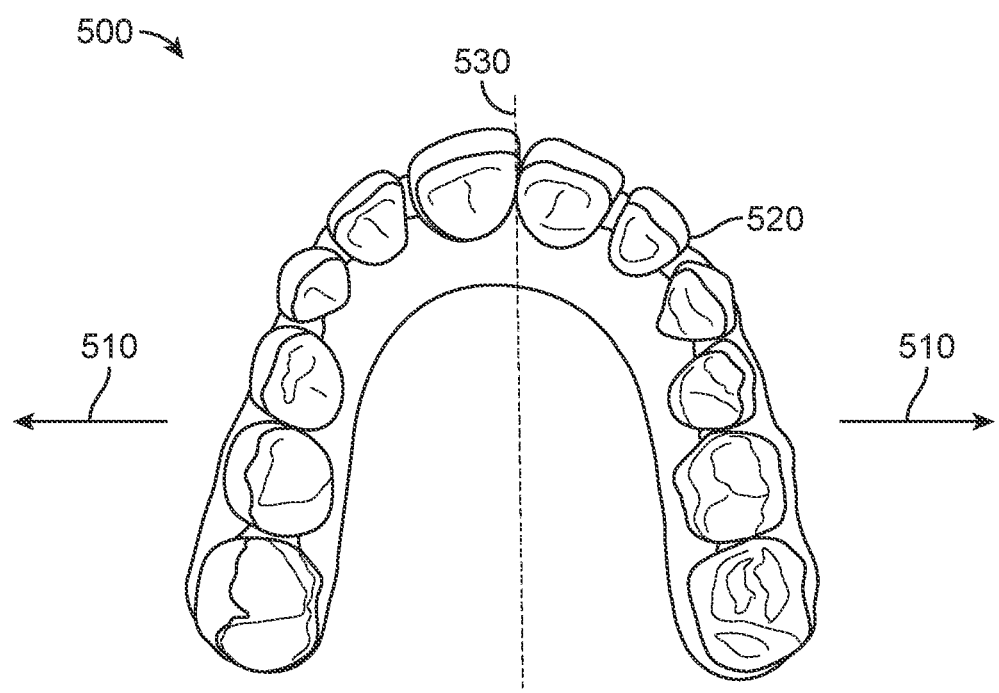
FIG. 5A illustrates a dental arch undergoing expansion, in accordance with one or more embodiments herein.

Arch expansion is a process for managing crowding, crossbites, among other dental issues in orthodontic treatment. During arch expansion, interproximal spaces, the space between a tooth and its adjacent tooth, may increase. As shown in FIG. 5A, a polymeric shell appliance or aligner 520 applies forces 510 to teeth and aids in moving the teeth away from the midline 530, expanding the arch and providing additional space between adjacent teeth. The force applied by the aligner on the teeth creates a moment of force around the tooth's center of resistance and therefore can cause the tooth to tip. The aligner applies forces to the crown of the tooth, which may be offset from the center of rotation of the tooth, resulting in a moment and causing the tooth to tip.

Figure 5B:
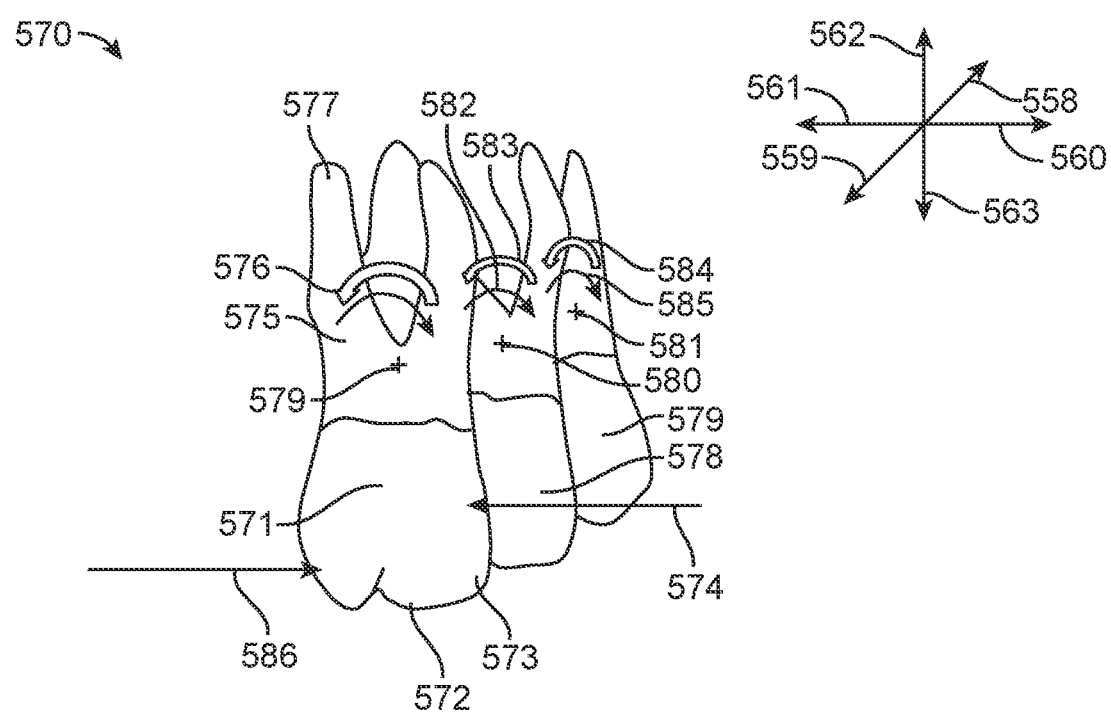
FIG. 5B illustrates expansion forces on teeth, in accordance with one or more embodiments herein.

FIG. 5B depicts three teeth 579, 580, and 581 and the expansion forces that may cause each of the teeth 570 to tip. The view shown in FIG. 5B is oriented as where a first axis is in the anterior 558 and posterior 559 directions, a second axis is in the lingual 560 and buccal 561 directions, and a third axis is in the dorsal 562 and ventral 563 directions. The teeth 570 depicted in FIG. 5B include a root 577 and a crown 572. A polymeric appliance may apply forces to the crown 572 of each tooth to move the teeth.

FIG. 5B depicts three posterior teeth including a bicuspid 579, a first molar 578 or a second molar 571. Although described with respect to the teeth 570, the principals discussed herein may apply to other teeth. In some embodiments, arch expansion forces may be applied to one or more of a plurality of posterior teeth such as a plurality of molars or bicuspids and combinations thereof. In some embodiments, arch expansion forces may be applied to a third molar, such as a wisdom tooth. In some embodiments, the arch expansion forces may be applied to one or more anterior teeth, which may include one or more of a bicuspid, a cuspid (canine), or incisor.

Each tooth may rotate about a center of resistance in reaction to forces applied to the tooth at a location displaced a distance from the center of resistance. A tooth may rotate about its center of resistance about one or more axis, for example, in three dimensions about the center of resistance. As shown in FIG. 5B, the first molar 578 and the second molar 571 have respective centers of resistance 580, 579 located near the trifurcation of the respective tooth's roots. The bicuspid 579 may also have a center of resistance 581. The location of each of the centers of resistance may vary based on tooth shape, including the size, shape, and length of the crown and root, along with the other factors, such as the resistance provided by the gingiva, and depth of the root in gingiva, and other factors.

The application of forces to a tooth in order to move the tooth may result in a moment applied to the tooth about the center of resistance. In many embodiments, a target tooth to be moved, such as bicuspid 579, receives a force 586 imparted by the polymeric shell appliance, which can be a direct force from the surface of the interior of the polymeric shell appliance or indirectly through an attachment and combinations thereof.

In many embodiments, for example, as shown in FIG. 5B a second molar 571 has a substantially exposed surface suitable for engagement with the polymeric appliance. The polymeric shell appliance can generate force along the lingual surface 573 of the crown 572 at a locus of engagement as indicated with arrow 586. Alternatively or additionally, attachment structures may be fabricated to engage teeth at one or more locations to provide forces. The force exerted on the lingual surface 573 is indicated. The force 574 generates a moment 575 about the center of resistance 579 of the second molar 571, for example. In many embodiments, the force of the appliance generates a moment 582 around the center of resistance 580 of first molar 578, and a moment 585 about the center of resistance 581 of the bicuspid 579, for example. The moments 575, 582, 585 caused by the forces exerted by the appliance may result in the undesired tipping of the tooth towards the buccal direction.

In some embodiments, to counteract the tipping moment 575 caused by the movement force 574, the aligner may impart a moment 576 on the tooth that counteracts the tipping moment 575. The contact between a polymeric shell appliance and the tooth can generate a counter force as indicated with arrow 586 opposite the force indicated with arrow 574 in order to generate a counter moment 576. When force 574 is applied to second molar 571, a moment 575 is created, and when counter force 586 is applied to second molar 571, a counter moment 576 is created. The counter moment 576 can be the same magnitude as the moment 575, such that the crown of the second molar 571 does not tip, for example with the differential moment of zero resulting from the sum of moment 575 with counter moment 576. Alternatively, counter moment 576 can be less than moment 575 such that the crown of second molar 571 is rotated toward the buccal side. In some embodiments, the counter moment 576 can be greater than the moment 575, such that the crown of a tooth is rotated toward the lingual side. In some embodiments, the crown has an initial inclination towards the buccal direction, a force and counter force are applied to the crown resulting in a moment and a counter moment, and the counter moment is greater than the moment, resulting in a tipping of the tooth towards the lingual side and a correction of the initial buccal inclination.

Segregated Staging During Expansion

Figure 6A:
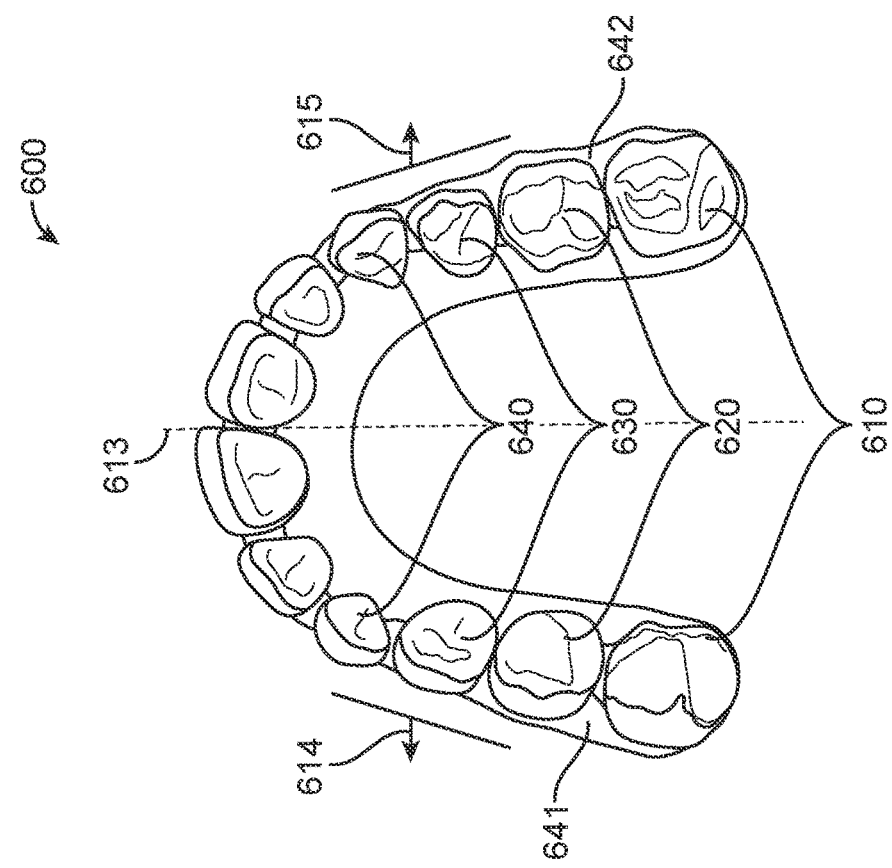
FIG. 6A illustrates a dental arch during the process of expansion, in accordance with one or more embodiments herein.
Figure 6B:
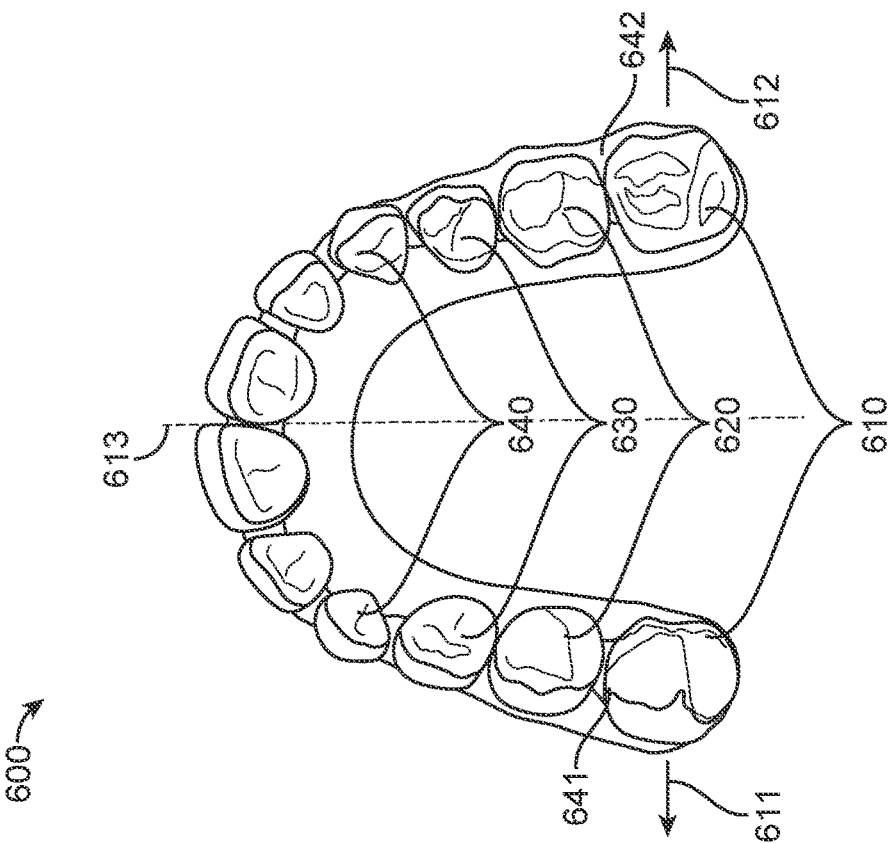
FIG. 6B illustrates a dental arch during the process of expansion, in accordance with one or more embodiments herein.

FIGS. 6A and 6B illustrate a dental arch 600 at two stages of arch expansion using a segregated staging process. In some embodiments, arch expansion may take place in stages wherein different teeth or groups of teeth are expanded in separate stages of treatment. In the embodiment shown in FIGS. 6A and 6B, the molars 610 are expanded in a first stage and the first molar 620, bicuspid 630, and canine 640 teeth are expanded in a second stage. Expansion of the teeth is the movement of one or more of a plurality of teeth from the lingual side towards the direction of the buccal side. In segregated staging, one or more of a plurality of teeth move in the buccal direction while one or more other teeth serve as an anchor.

FIG. 6A shows a first stage of arch expansion using a segregated staging process. In the first stage, second molars 610 are exposed to movement forces 611 and 612 in the buccal direction, away from the mid-sagittal line 613. In the first stage first molar 620, bicuspid 630, and canine 640, serve as anchors for the movement of the second molars 610. As anchors, first molar 620, bicuspid 630, and canine 640 provide support during the movement of the second molars 610 to aid in the process of expansion of the second molars 610. At the beginning of the first stage, the interproximal spaces 641, 642, being the distance between the second molar 610 and the first molar 620, are at a first distance. Additionally, the interproximal spaces between a tooth and its adjacent tooth are at a first distance, for example, the first molar 620 and the bicuspid 630, the bicuspid 630 and the canine 640, the canine 640 and the lateral incisor, and the lateral incisor and the medial incisor.

In some embodiments, after the second molars 610 reach their target position, a second stage of arch expansion may begin. During the second stage, for example, second molars 610 serve as anchors for the teeth that move in the next stage of tooth expansion using a segregated staging process.

FIG. 6B shows a second stage of arch expansion using the segregated staging process. At the beginning of the second stage, which may also be the end of the first stage, the interproximal spaces 641, 642 between the second molar 610 and the first molar 620 are a second, greater, distance. The larger space provides room for the next teeth in the process of expansion to move into. Additionally, the first molar 620, the bicuspid 630, and the canine 640, having served as anchors during the first state the interproximal space between adjacent teeth, for example, the first molar 620, the bicuspid 630, the canine 640, and the incisor, and its adjacent tooth remain at the first magnitude.

In the second stage, first molars 620, bicuspids 630, and canines 640 are exposed to movement forces 614 and 615 in the buccal direction, away from the mid-sagittal line 613. In the second stage, the second molars 610 serve as anchors during the movement of the first molars 620, the bicuspids 630, and the canines 640 to aid in the process of expansion of the first molars 620, bicuspids 630, and canines 640. As anchors, the second molars 610 provide support during the movement of the first molar 620, the bicuspid 630, and the canine 640 to aid in the process of expansion of the second molars 610. At the end of the second stage, the interproximal distance between adjacent teeth is greater that than at the beginning of the second stage. For example, the interproximal distance between the first molars 620 and the bicuspids 630 is increased, as is the interproximal distance between the bicuspids 630 and the canines 640.

Aligner Features for Increased Force During Expansion

Figure 7:
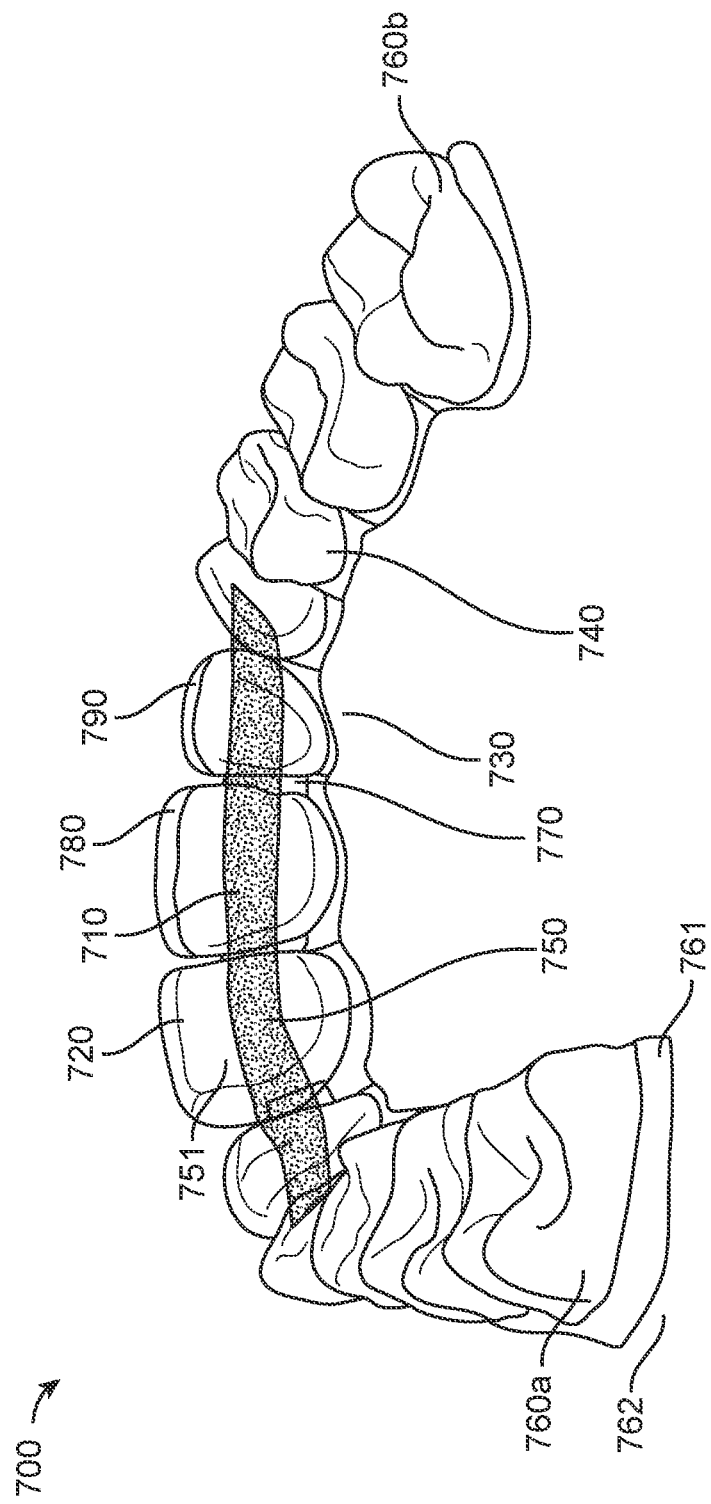
FIG. 7 illustrates a polymeric shell appliance, modified to increase the expansion force distributed to the posterior teeth, in accordance with one or more embodiments herein.

Arch expansion is a process where the polymeric shell appliance applies forces on the teeth of a dental arch 700 to aid in the movement of teeth away from the mid-saggittal line. The magnitude of force applied by the polymeric shell appliance to the teeth may be increased with modifications to the polymeric shell appliance. FIG. 7 illustrates a polymeric shell appliance with a lingual bar 710. In some embodiments, the lingual bar is added to the lingual structure of the polymeric shell appliance to increase stiffness, for example, the lingual walls of the tooth receiving cavities may be reinforced with the lingual bar 710. In some embodiments, the lingual bar 710 is formed or coupled to the outer lingual surface of the polymeric shell appliance. The outer lingual surface of the polymeric shell appliance is the surface that faces away from the lingual surface of the teeth. In some embodiments, the lingual bar is added to the lingual inner surface of the polymeric shell appliance to increase stiffness, where the lingual inner surface of the polymeric shell appliance is the surface that engages the lingual surface of the teeth. The lingual bar is made of stiffening elements that increase the stiffness of the polymeric shell appliance. In some embodiments, the lingual bar 710 may be made from a material having a greater modulus of elasticity than that of the material from with the tooth receiving cavities are formed. Material for the lingual bar may include, but is not limited to thermoplastics or polyurethane. In other embodiments, the lingual bar 710 may be added on the lingual surface of the teeth 720.

The shape of the lingual bar affects the distribution of the applied force from the polymeric shell appliance. In some embodiments, the lingual bar 710 may extend along the lingual surface of the dental arch 700 as part of a polymeric shell appliance from one distal end 760a to the other distal end 760b. In some embodiments, the lingual bar 710 may extend over a portion of the lingual surface of the dental arch 700. In some embodiments, the posterior edge 750 of the lingual bar 710 has a shape. In some embodiments, the shape of the posterior edge 750 of the lingual bar 710 may be an extended straight line that lies near, above, or below the gum line 740. In some embodiments, the shape of the posterior edge 750 of the lingual bar 710 may contour the gum line 740 from one distal end 760 to the other distal end 760.

The height of the lingual bar can also affect the distribution of the applied force from the polymeric shell appliance. The height of the lingual bar is the distance from a first edge, such as an anterior edge 751 of the lingual bar to an opposite second edge, such as a posterior edge 750. In some embodiments, the distance is measured along an anterior-posterior direction. As shown in FIG. 7, the lingual bar 710 covers a portion of the lingual surface of the teeth. In some embodiments, the lingual bar may cover the lingual soft tissue of the gums 730.

In some embodiments, interproximal engagement structures may be used to provide additional arch expansion capabilities. Interproximal engagement structure, extend at least partially into the interproximal space of adjacent teeth to engage the teeth and apply an expansion force to the teeth to increase the interproximal distance between the adjacent teeth. For example, the interproximal engagement structure 770 is located in the interproximal space between the central incisor 780 and the lateral incisor 790. During the arch expansion process, the interproximal engagement structure 770 may allow increased engagement of tooth surface by the polymeric shell appliance and also provides for application of forces to the sides of teeth from the interproximal area.

The interproximal engagement structures may also provide improvement tooth engagement and improved tooth-moving forces by providing engagement at or proximate to the gingival line and closer to a center of resistance of the tooth. This lower application of tooth movements forces from the interproximal region is a more direct application of arch expansion forces and, when used with other arch expansion techniques, such as the segregated arch expansion process, discussed herein, where forces are applied to the lingual side of the tooth and in a buccal direction, may reduce the lingual-buccal forces used in such a process to get similar arch expansion and separation of teeth, and thereby lowers the tipping moment and tipping induced in teeth during arch expansion. In some embodiments, the interproximal structure 770 may extend from the polymeric shell appliance at a tooth facing surface of the lingual side 761. In some embodiments, the interproximal structure 770 may extend from the polymeric shell appliance from a tooth facing surface on the buccal side 762. In some embodiments, one or more interproximal structures may extend from tooth facing surfaces of both the lingual and buccal sides 761,762.

Figure 15:
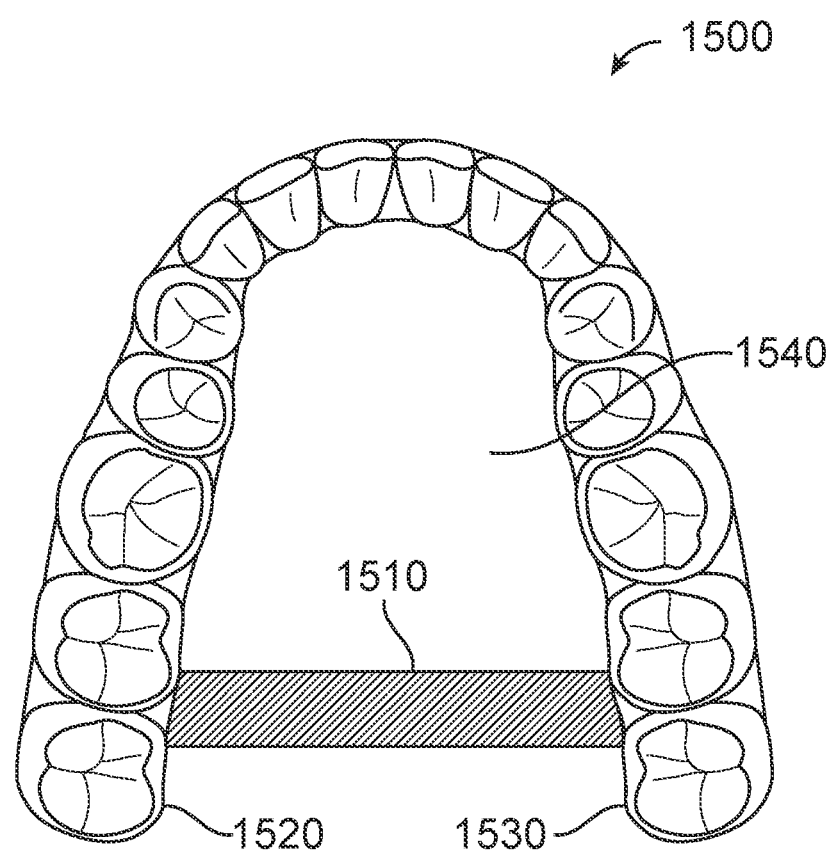
FIG. 15 illustrates a transpalatal arch feature, in accordance with one or more embodiments herein.

In some embodiments, the magnitude of force applied by the polymeric shell appliance to the teeth can be increased with a trans-palatal link. As shown in FIG. 15, a trans-palatal link 1510 extends across the palate of the mouth 1540 and attaches to or extends from the outward facing lingual surfaces of 1530, 1520 of the polymeric shell appliance. As described above, during expansion, the polymeric shell appliance applies a force on the dental arch in the buccal direction, and the trans-palatal link may apply an arch expansion force on the dental arch in the buccal direction.

Figure 8:
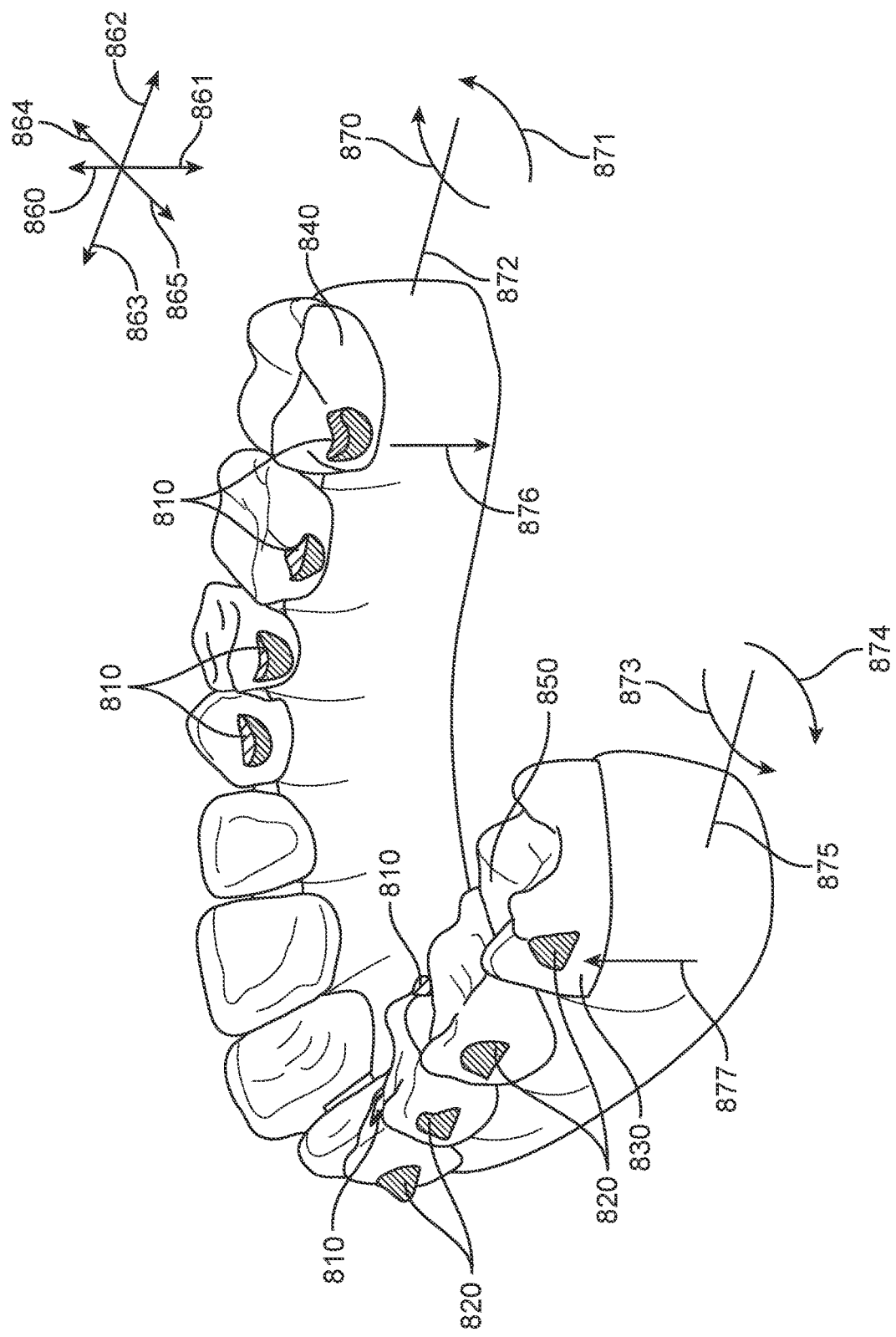
FIG. 8 illustrates a polymeric shell appliance, modified to increase force distribution, in accordance with one or more embodiments herein.

As shown in FIG. 8, in some embodiments, tooth attachments, such as lingual and buccal tooth attachments 810, 820 may provide additional forces to the teeth. Tooth attachments 810, 820 are additional orthodontic appliances that may be coupled to the buccal 830 or lingual 840 surfaces of one or more of a plurality of teeth. For example, in some embodiments, the active plane is parallel to the direction of movement and normal to the tooth long axis. In such embodiments the force on the attachment active surface is normal to the direction of expansion and would create an appropriate counter moment.

When the polymeric shell appliance is placed over the teeth with the attachments 810, 820, a force is applied by the polymeric shell appliance on the tooth attachments 810, 820 and subsequently on the teeth. These forces generate a counter moment 874 about the teeth's center of resistance 872, 875 that counters the tipping forces or the moment 874 generated polymeric shell appliance.

In some embodiments, for example, the tooth attachments 810 are located on the lingual side. The polymeric shell appliance that is placed over the teeth with the attachments 810 applies a force 876 in the apical direction on the tooth attachments. This force may act to cause intrusion of the tooth and generates a counter moment 871 about each tooth's center of resistance 872 and opposes the moment force 870 that is generated by the polymeric shell appliance during expansion.

In some embodiments, for example, the tooth attachments 820 are located on the buccal side of the teeth. The polymeric shell appliance that is placed over the teeth with the attachments 820 applies a force 877 in the coronal direction on the tooth attachments 820. This force may act to cause extraction of the tooth and generates a counter moment 874 about each tooth's center of resistance 875 and opposes the moment force 873 that is generated by the polymeric shell appliance during expansion.

When attachments 810, 820 are placed on both the lingual and buccal sides of the same tooth, the intrusion and extrusion forces on the tooth may cancel each other out, such that the tooth is not extruded or intruded, but the moments created by the forces may remain and thus impart an anti-tipping moment without unwanted or unplanned extraction or intrusion of the tooth.

Aligner Features for Controlling Force Delivery and Distribution During Expansion Opposing Arch Features for Moment Control FIG. 9 illustrates a buccal-lingual cross section of tooth receiving cavities 910, 911 of a set of upper and lower polymeric shell appliances. As shown, the tooth receiving cavity 910 of an upper jaw includes a first opposing arch feature 930 and the tooth receiving cavity 911 of a lower jaw includes a second opposing arch feature 931. The opposing arch features 930, 931 may aid in controlling tooth tipping. The first opposing arch feature 930 is coupled to the lingual surface 970 of the tooth receiving cavity 910 of the upper jaw, and the second opposing arch feature 931 is coupled to the lingual surface 971 of the tooth receiving cavity 911 of the lower jaw.

As discussed above, during arch expansion treatment, the polymeric shell appliance can apply forces on the teeth that generate tipping moments about each tooth's center of resistance. These tipping moments may cause the teeth to tip towards the buccal direction. The opposing arch features 930, 931 may aid in counteracting the tipping moment by generating counter moments 960, 961 about the tooth's center of resistance. The counter moments 960, 961 are generated when the opposing arch features 930, 931 come in contact upon natural occlusion of the dentitions.

The position and shape of the opposing arch features may alter the moment forces 960, 961 that are produced upon natural occlusion of the upper and lower dentitions. The occlusal surface 991 of the opposing arch feature 930 in the upper jaw may contact the occlusal surface 992 of the opposing arch feature 931 in the lower jaw, creating forces on opposing arch features 930, 931 in the anterior-posterior 903, 904 directions and resulting moments 960, 961 about the each tooth's 910, 911 center of resistance 993, 994.

In some embodiments, the opposing arch features 930, 931 may extend along the anterior 903 and posterior 904 direction of the lingual surface 970, 971 of each tooth 910, 911. In some embodiments, the opposing arch feature 930 may extend along the entire lingual surface 970, and the opposing arch feature 931 may extend along the entire lingual surface 971. In other embodiments, the opposing arch feature 930 may extend along a portion of the lingual surface 970, and the opposing arch feature 931 may extend along a portion of the lingual surface 971.

In many embodiments, the opposing arch features 930, 931 may have an extension that extends beyond the occlusal surface of the tooth receiving cavity to which it is attached. For example, the opposing arch feature 930 includes and extension 990 that extends beyond the occlusal surface 940 of the toot receiving cavity in the coronal direction, such that the occlusal surface 991 of the opposing arch feature extends beyond the occlusal surface 940 of the tooth to which it is attached. In some embodiments, the occlusal surface 991 of the opposing arch feature 930 may terminate at or below the occlusal surface of the tooth to which it is attached. The occlusal surface 991 of the extended portion 990 of the opposing arch feature 930 in the upper jaw may come in contact with the occlusal surface 992 of the opposing arch feature 931 in the lower jaw and thereby exert forces on each other, creating moments 960, 961 about the respective tooth's center of resistance.

Figure 9A:
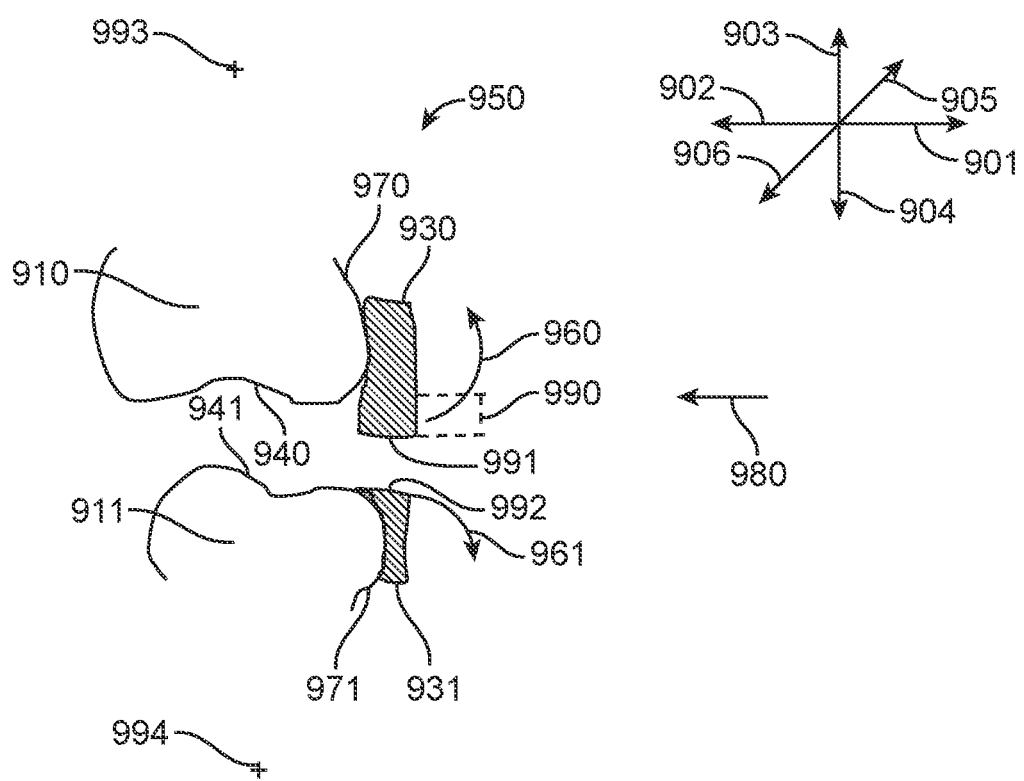
FIG. 9A illustrates a modified polymeric shell appliance with an opposing arch feature, in accordance with one or more embodiments herein.

The opposing arch features 930, 931 may be coupled to the tooth receiving cavities 910, 911 of the polymeric shell appliance. For example, as shown in FIG. 9A, the opposing arch features 930, 931 are attached to the lingual surfaces of the tooth receiving cavities after fabrication of the appliance that includes the tooth receiving cavities. In some embodiments, the opposing arch features 930, 931 may be coupled to the polymeric shell appliance with an adhesive, such as an epoxy. In some embodiments, the shell appliance and/or the opposing arch features may be heated and fused together. In some embodiments, the opposing arch features may be thermosonically welded to the appliance.

Figure 9B:
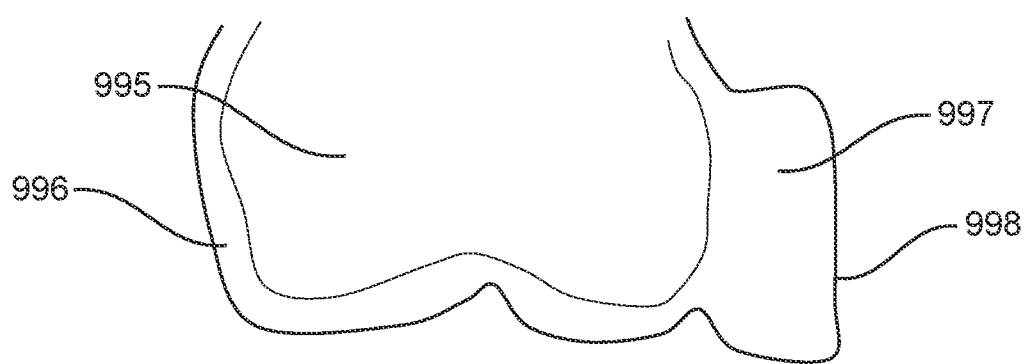
FIG. 9B illustrates a modified polymeric shell appliance with an opposing arch feature, in accordance with one or more embodiments herein.

In some embodiments, the opposing arch features and the tooth receiving cavities may be fabricated as a single structure. For example, as shown in FIG. 9B, a tooth receiving cavity 996 of an appliance is applied to a tooth. The appliance includes an integrally formed opposing arch features 998. In the embodiment depicted in FIG. 9B, the tooth receiving cavity includes a cavity 997 formed by the opposing arch feature such that the lingual surface 999 of the opposing arch feature 998 is also the lingual surface of the tooth receiving cavity 996. In some embodiments, the cavity 997 may be filled with a material to provide support to the opposing arch feature 998.

Occlusal Features for Moment Control

Figure 10A:
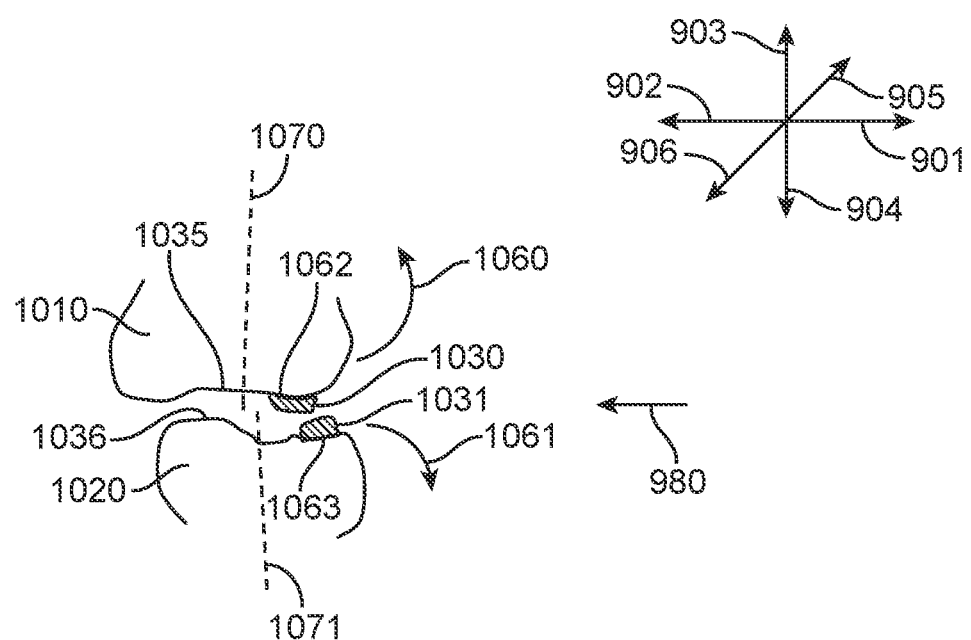
FIG. 10A illustrates a modified polymeric shell appliance with occlusal attachments, in accordance with one or more embodiments herein.

FIG. 10A illustrates a buccal-lingual cross section of tooth receiving cavities 1010, 1011 of a set of upper and lower polymeric shell appliances. As shown, the tooth receiving cavity 1000 is in a lingual-buccal direction 901, 902 of a tooth receiving cavity 1010 of an upper jaw and a tooth receiving cavity 1020 of a lower jaw, with occlusal features 1030, 1031 for controlling tooth tipping. An occlusal feature 1030 is coupled to the occlusal surface 1035 of the tooth receiving cavity 1010 of the upper jaw, and an occlusal feature 1031 is coupled to the occlusal surface 1036 of the tooth receiving cavity 1020 of the lower jaw.

As discussed above, during arch expansion treatment, the polymeric shell appliance can apply a force on the teeth that generates a tipping moment about each tooth's center of resistance, which may cause the teeth to tip towards the buccal direction. The occlusal features 1030, 1031 may aid in counteracting the tipping moment by generating counter moments 1060, 1061 about the tooth's center of resistance. The counter moments 1060, 1061 are generated when the occlusal features 1030, 1031 come in contact upon natural occlusion of the dentitions.

The position and shape of the occlusal features may alter the moment force that is produced upon natural occlusion of the upper and lower dentitions. In some embodiments, for example, the occlusal features 1030, 1031 may cover a portion of the occlusal surfaces 1035, 1036 on the lingual side of the teeth's center axes 1070, 1071 where the occlusal features 1030, 1031 extend along the axis in the lingual 901 and buccal 902 directions and the axis in the distal 905 and mesial 906 directions. In some embodiments, for example, the occlusal features 1030, 1031 may extend along the entire occlusal surfaces 1035, 1036. In some embodiments, for example, the occlusal features may extend along a portion of the occlusal surfaces 1035, 1036 and extend beyond and onto the lingual surfaces.

Figure 10B:
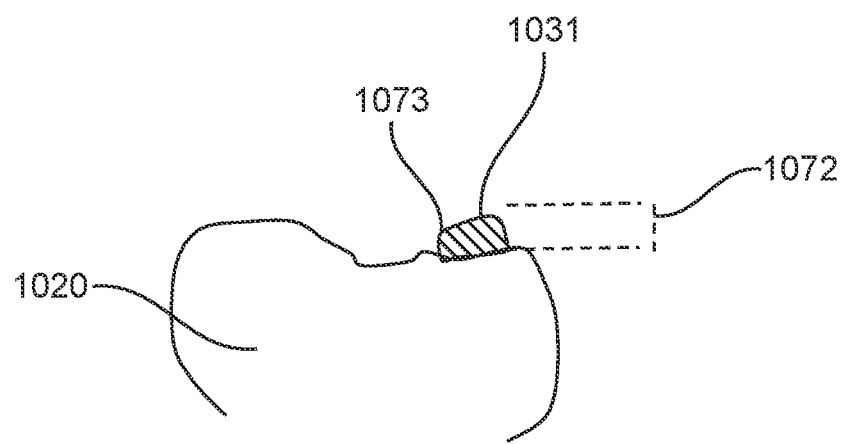
FIG. 10B illustrates a modified polymeric shell appliance with occlusal attachments, in accordance with one or more embodiments herein.

As shown in FIG. 10B, the height 1072 of the occlusal feature 1031 can be constant or variable. The occlusal surface 1073 of the occlusal feature 1030 in the upper jaw (see FIG. 10A) may contact the occlusal surface of the opposing occlusal feature 1031 in the lower jaw, creating a moment about a centers of resistance on the anterior-posterior axes. In many embodiments, the occlusal feature can have a height equal to, approximately equal to, greater than, or less than the distance between the occlusal surface 1035 of the tooth receiving structure in the first dental arch and the occlusal surface 1036 of the tooth receiving structure 1020 in the lower dental arch, for example, in some embodiments, a person's natural resting jaw position may be such that the features are engaged and a counter moment is applied to the patient's teeth. In some embodiments, intermittent contacts may be expected during natural articulations of the jaw.

These intermittent contacts may be such that the features are intermittently engaged and a counter moment is intermittently applied to the patient's teeth.

In some embodiments, the natural resting jaw position or intermittent contact may not be sufficiently predictable or frequent. In such embodiment, contact can be encouraged or forced using mechanisms such as an elastic that connects the upper and lower arch. FIG. 10D shows an embodiment of an elastic 1064 that connects the upper and lower arch of the patient and encourages contact between the features 1030, 1031. Elastics 1064, or a similar mechanism, could additionally control the normal force on the occlusal features, and thus the corrective moment and can be applied at various times of the day, for example, during sleep, or at other times, according to the treatment plan.

Returning now to FIG. 10A, the occlusal feature 1030, 1031 may be coupled to the tooth receiving cavities 1010, 1020 of the polymeric shell appliance. In some embodiments, the tooth receiving cavity is formed first and then the occlusal features 1030, 1031 are formed. As shown in FIG. 10A, the occlusal features 1030, 1031 may be shaped to include an occlusal surface 1062, 1063 to detachably mate with at least the occlusal surfaces 1035, 1036 of the tooth receiving cavities 1010, 1020 of the polymeric shell appliance.

Figure 10C:
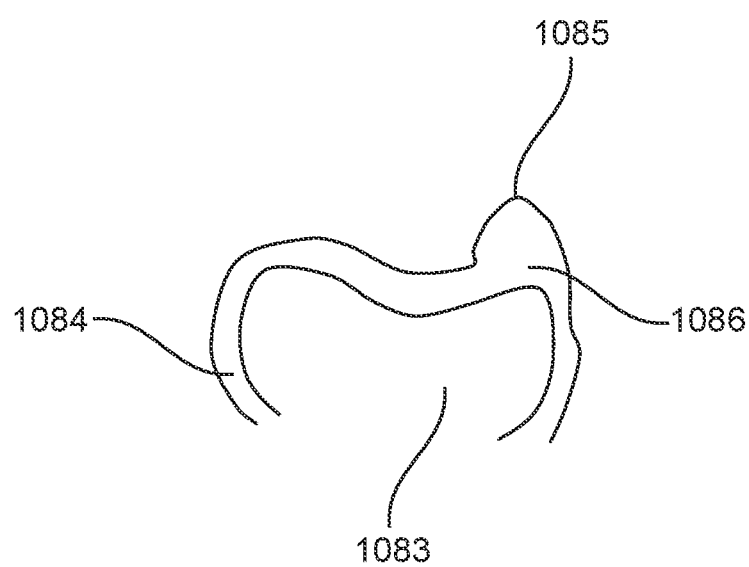
FIG. 10C illustrates a modified polymeric shell appliance with occlusal attachments, in accordance with one or more embodiments herein.
Figure 10D:
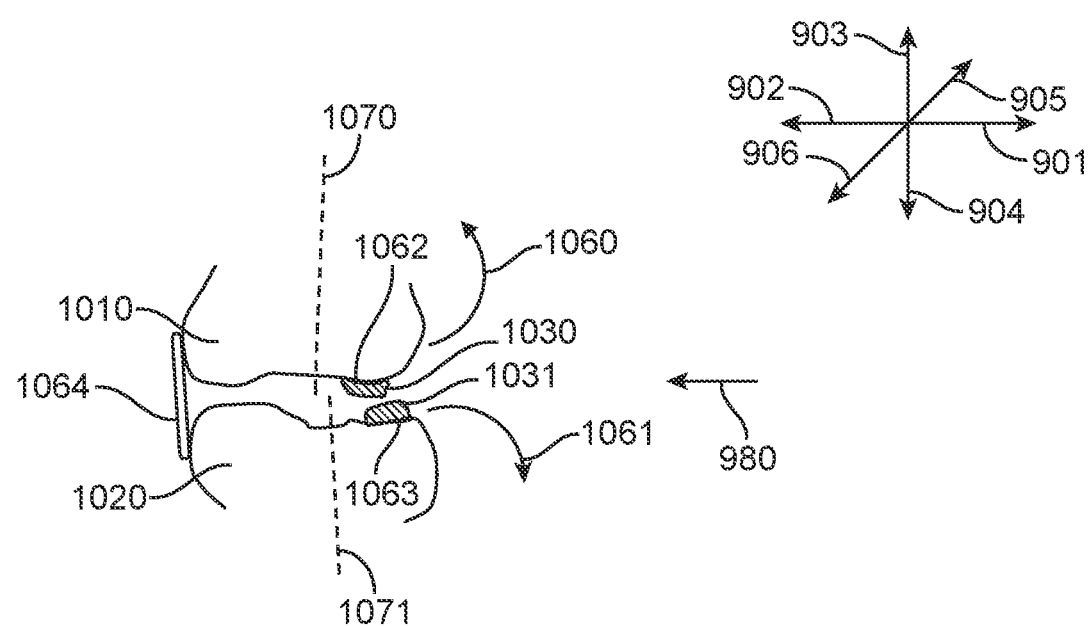
FIG. 10D illustrates a modified polymeric shell appliance with occlusal attachments, in accordance with one or more embodiments herein.

In some embodiments, for example as show in FIG. 10C, the tooth receiving cavity 1084 may be formed simultaneously with the occlusal feature 1085. In some embodiments, the outer surface of the occlusal feature 1085 may be an extension of the tooth receiving cavity 1084 and the inner portion 1086 of the occlusal feature 1085 is an extension of the tooth receiving cavity. In some embodiments, the inner portion 1086 of the occlusal feature 1085 may be filled with material. The tooth receiving cavities and the occlusal features may be fabricated from the same materials or from different materials as described herein.

FIG. 10D illustrates a buccal-lingual cross section of tooth receiving cavities 1010, 1011 of a set of upper and lower polymeric shell appliances of FIG. 10A. As shown, the tooth receiving cavity 1000 is in a lingual-buccal direction 901, 902 of a tooth receiving cavity 1010 of an upper jaw and a tooth receiving cavity 1020 of a lower jaw, with occlusal features 1030, 1031 for controlling tooth tipping. An occlusal feature 1030 is coupled to the occlusal surface 1035 of the tooth receiving cavity 1010 of the upper jaw, and an occlusal feature 1031 is coupled to the occlusal surface 1036 of the tooth receiving cavity 1020 of the lower jaw.

As discussed above, during arch expansion treatment, the polymeric shell appliance can apply a force on the teeth that generates a tipping moment about each tooth's center of resistance, which may cause the teeth to tip towards the buccal direction. The occlusal features 1030, 1031 may aid in counteracting the tipping moment by generating counter moments 1060, 1061 about the tooth's center of resistance. The counter moments 1060, 1061 are generated when the occlusal features 1030, 1031 come in contact upon natural occlusion of the dentitions. The position and shape of the occlusal features may alter the moment force that is produced upon natural occlusion of the upper and lower dentitions.

Torsional Rigidity Features for Moment Control

Figure 11:
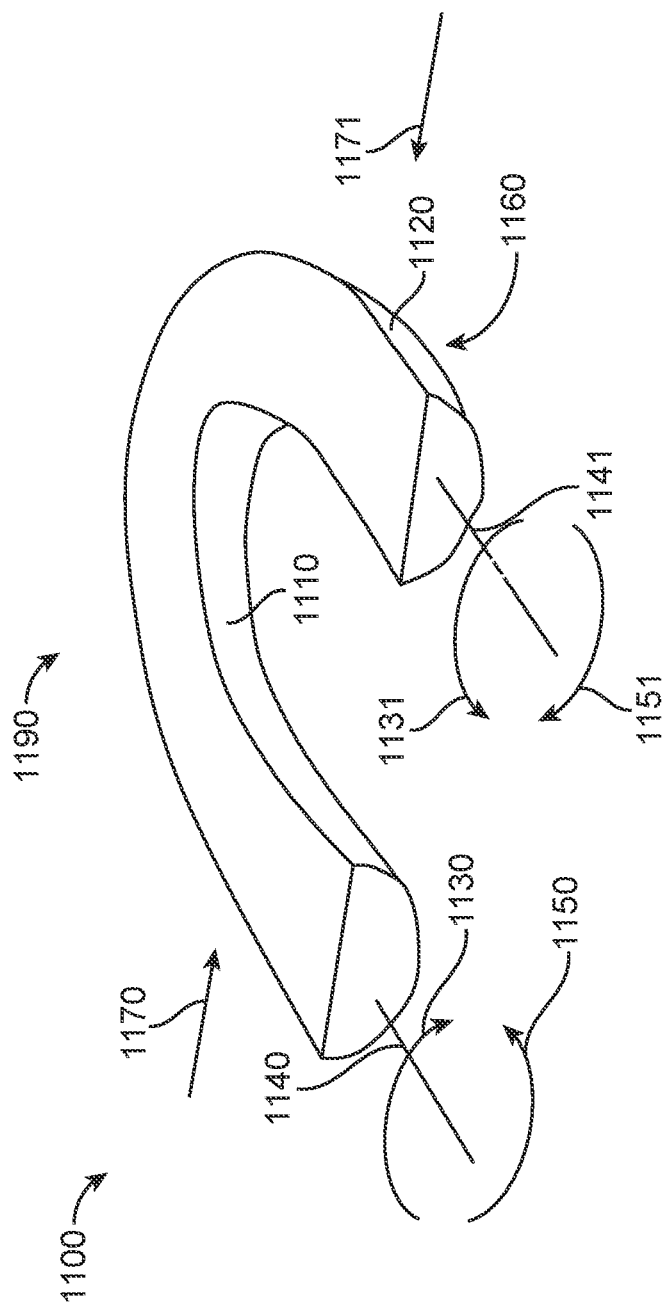
FIG. 11 illustrates torsional rigidity of a polymeric shell appliance, in accordance with one or more embodiments herein.

FIG. 11 illustrates the role of the torsional rigidity of a polymeric shell appliance 1110 on countering tooth tipping. As discussed above, during arch expansion treatment, the polymeric shell appliance 1110 can apply a force on the teeth that generates a tipping moment 1150, 1151 about the teeth's center of resistance 1140, 1141, which may cause the teeth to tip towards the buccal direction. The torsional rigidity of the polymeric shell appliance 1110 may aid in counteracting the tipping moment by generating counter moments 1130, 1131 about the tooth's center of resistance 1140, 1141. The counter moments 1130, 1131 are generated from the torsional rigidity of the polymeric shell appliance. When an appliance applies an arch expansion force onto the teeth, a torsionally flexible appliance may provide little to no anti-tipping moments to the tooth, but a stiff appliance resists the tipping of the tooth and applies a force and counter tipping moment to the tooth.

The stiffness of the appliance is dependent, in part, on the structure and the material properties, such as elastic modulus, of the polymeric shell appliance. The stiffness of the polymeric shell appliance may be due to structural design as well as the thickness. The material properties may be altered by varying the material or combination of materials for fabrication of the polymeric shell appliance as described herein.

Occlusal Cusp for Moment Control

Figure 12:
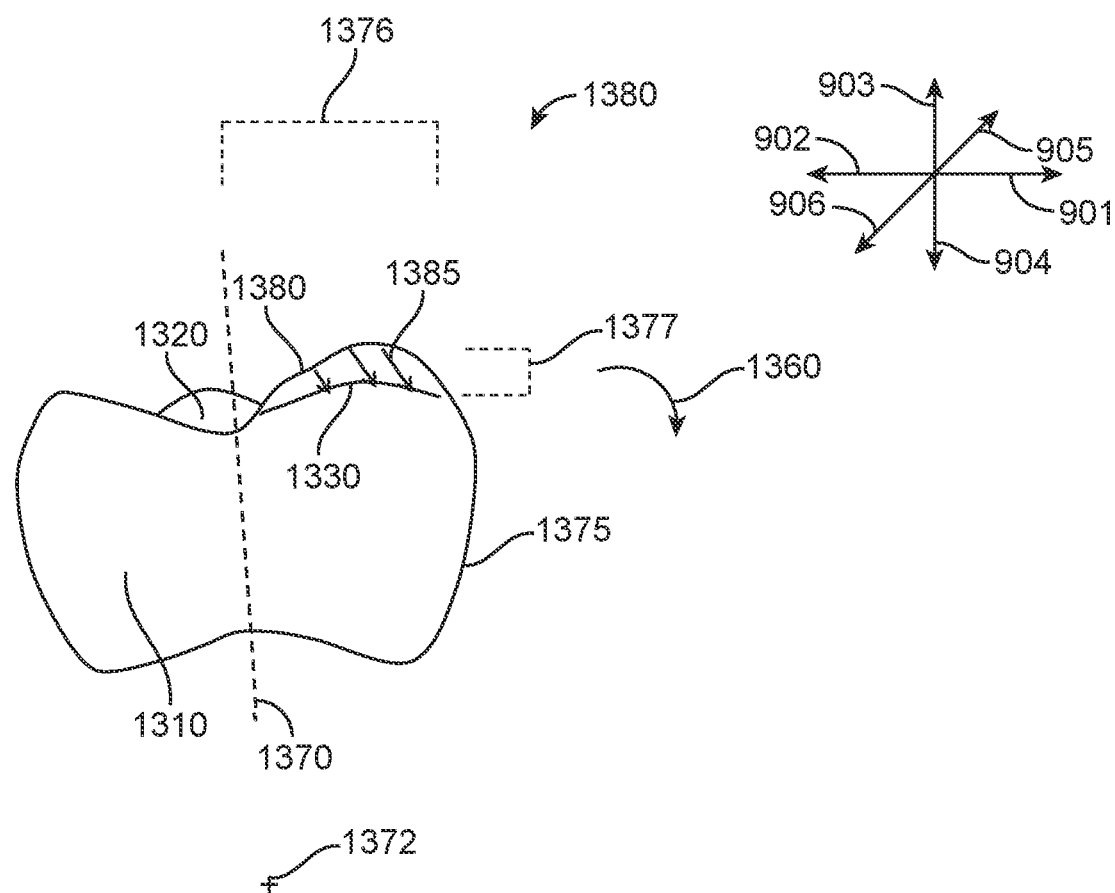
FIG. 12 illustrates modification of a polymeric shell appliance with activated dental anatomy; in accordance with one or more embodiments herein.

FIG. 12 illustrates a cross section of a molar 1310 in a lingual-buccal direction 901, 902 and indicates the location of an occlusal cusp 1330 for controlling tooth tipping. In some embodiments, a aligner may impart a moment on the tooth by applying a force on a surface of an occlusal cusp of a tooth. Arrows 1385 illustrate a distributed force applied to the occlusal cusp of the tooth 1310. Although shown as a distributed force, the force applied to the occlusal cusp may also be a point force. The force 1385 may be offset from and in a direction other than towards the center of resistance of the tooth 1310. Such a force 1385 may impart a moment 1360 onto the tooth 1310 about the tooth's center of resistance. This moment 1360 may counter act a moment applied to the tooth and caused by the arch expansion forces on the tooth.

Aligners apply forces on teeth because one or both of the shape and position of the tooth facing surfaces of a tooth receiving cavity of an appliance differs from the shape or position of the tooth received within the cavity. FIG. 13B illustrates an example of an appliance 1350 having a tooth receiving cavity 1352 shaped to impart an anti-tipping moment inducing force onto a tooth cusp. In particular, the tooth receiving cavity 1352 includes a cusp portion 1340.

Figure 13:
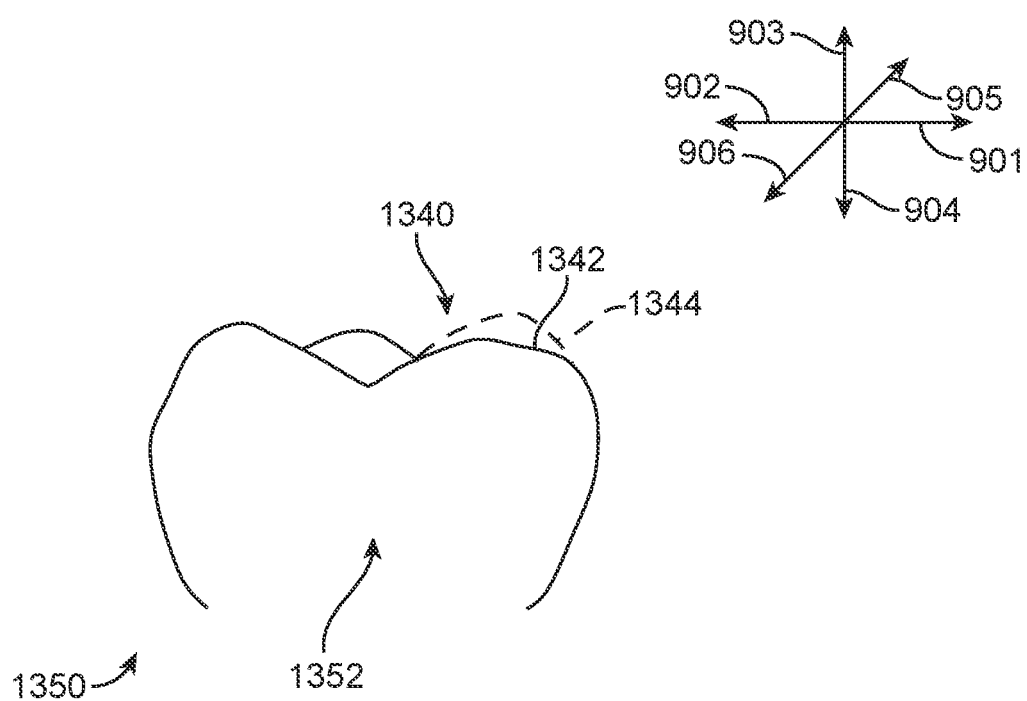
FIG. 13 illustrates a shell appliance having a modified cusp cavity for activated dental anatomy, in accordance with one or more embodiments herein.

FIG. 13 shows both an unactivated shape 1344 and an activated shape 1342 of the occlusal cusp portion 1340 of the tooth receiving cavity 1352. The unactivated shape 1344 is the shape of an occlusal cusp portion of a tooth receiving cavity that matches the geometry of the surface shape of the tooth received within the cavity. The activated shape 1342 is shaped to interfere with an occlusal cusp of a tooth within the tooth receiving cavity 1352. When the appliance 1350 is worn by a patient, the cusp of a tooth within the cavity 1352 pushes against the activated shape 1342 of the tooth receiving cavity, deforming the appliance 1350. The deformed appliance imparts a force on the cusp of the tooth. The resulting force induces a moment on the tooth.

Aligner Bridge for Moment Control and Space Creation

Figure 14A:
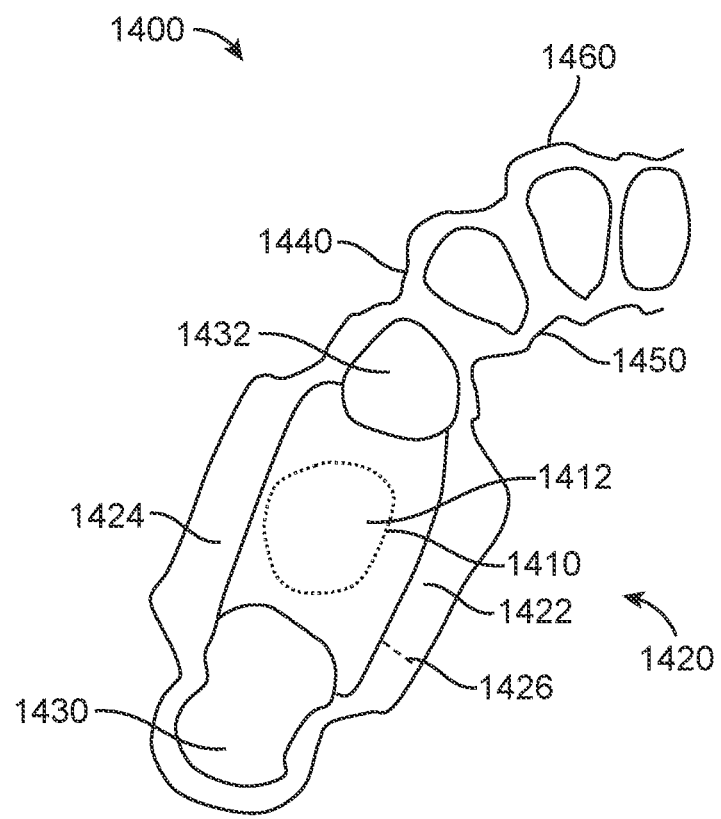
FIG. 14A illustrates a polymeric shell appliance with an aligner bridge, in accordance with one or more embodiments herein.

FIG. 14A illustrates an occlusal view of a partial dental arch 1400 with a cavity 1410 for an erupting tooth 1412 and a polymeric shell appliance 1460 applied to the arch 1400. The cavity 1410 may be the result of a missing tooth or an extracted tooth, for example. The polymeric shell appliance 1460 includes an aligner bridge 1420 that spans the cavity 1410. The aligner bridge 1420 may include two spans 1422, 1424 that extend between teeth 1430, 1432. The lingual span 1422 of the aligner bridge 1420 extends across the cavity 1410 on the lingual side of the dental arch, and the buccal span 1424 of the aligner bridge 1420 extends across the cavity 1410 on the buccal side of the dental arch.

When a tooth is extracted or falls out, the teeth adjacent the missing tooth, such as teeth 1430, 1432, may naturally begin to close the cavity 1410 formed in the absence of the tooth. The aligner bridge 1420 controls the size of the cavity 1410 for an erupting tooth or for future treatment plan options such as implantation of a prosthetic tooth. During Phase I interceptive treatment a treatment plan may aim to create or maintain space for erupting teeth. A treatment plan may model and predict the size and position of unerupted or erupting permanent dentition to form the target arch form and length and use the target arch from and length to determine a target position for the teeth in a treatment plan.

The bridge 1420 may maintain the special relationship between the teeth 1430, 1432 adjacent the cavity 1410 or may move them further apart to increase the distance between the teeth 1430, 1432 to make room for the erupting tooth 1412 or to correct an underside closing of the cavity 1410. In some embodiments, if there is a large gap between teeth, the force distributed to the distal tooth may be considerably less using a conventional aligner, because the force is transferred through bending in the aligner. The aligner bridge can serve to stiffen the aligner and allow larger forces to be transmitted across large gaps.

The position and shape of the aligner bridge 1420 may alter the force that is produced for controlling the size of the cavity 1410. The thickness 1426 of the aligner bridge 1420 may influence the force imparted by the polymeric shell appliance 1460. In some embodiments, the thickness of the spans 1424, 1422 may be such that resist the natural closing of the cavity 1410 in the absence of a tooth. In some embodiments, the thickness of the aligner bridge may be the same as the thickness of the polymeric shell appliance. In other embodiments, the thickness of the aligner bridge may be more than the thickness of the polymeric shell appliance. Also, the thickness 1426 throughout the mesial-distal length of the aligner bridge 1420, including the individual spans 1422, 1422 may be constant or variable. The fabrication process, as described herein, provides methods for the generating aligner bridges with various shapes and sizes. In some embodiments, an aligner bridge may have a thickness in the lingual-buccal direction of between 0.5 and 2 mm. In some embodiments, an aligner bridge may have a thickness in the lingual-buccal direction of between 1 and 2 mm.

In some embodiments, an aligner bridge, such as the aligner bridge 1420, may be used when a treatment plan for treating a patient's malocclusion accounts for additional space between teeth. In addition to moving teeth from an initial position towards a final position in a series of steps, the treatment plan may include, for example, allocation of space between teeth during the reposition process or as part of a final position. In some embodiments, the treatment plan may account for the eruption of a tooth during the treatment process, as discussed above.

In some embodiments, an aligner bridge may be used for expansion of teeth to increase the arch length, creating space along the arch or the expansion of the space between teeth may accompany other teeth movements, such as mesial-out rotation of the first permanent molar, to create space along the arch.

In some embodiments, expansion of the space between certain teeth can contain a mesial or distal component with respect to the arch to create space in one or more regions along the arch. Regions for increased space may be predicted based on one or more of the following: patient age, patient dentition, x-ray or CBCT data, clinical experience, clinical statistics, and doctor instruction.

In some embodiments, for example, as shown in FIG. 14A, the aligner bridge 1420 is fabricated as an integral component of the polymeric shell appliance. For example, the aligner bridge may be formed in the desired shape and position simultaneously with the polymeric shell appliance 1460.

Figure 14B:
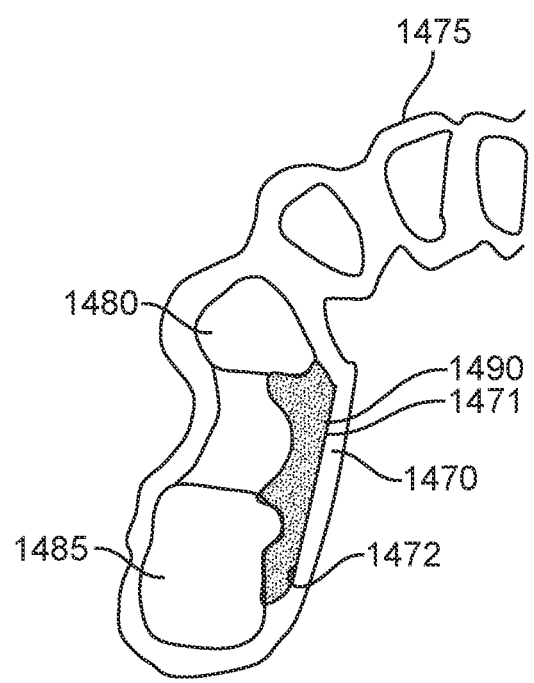
FIG. 14B illustrates a polymeric shell appliance with an aligner bridge, in accordance with one or more embodiments herein.

In other embodiments, for example as shown in FIG. 14B, the aligner bridge 1490 is fabricated separately from the polymeric shell appliance 1475. In some embodiments, the aligner bridge 1490 may be couplable to the polymeric shell appliance 1475. In some embodiments, the aligner bridge 1490 may be shaped to include a surface that couples to the surface of the aligner, for example, the buccal-facing surface 1471 of the polymeric shell appliance 1475 may mate with or otherwise be coupled to the lingual-facing surface 1472 of the aligner bridge 1470. In some embodiments, the lingual-facing surface 1472 of the aligner bridge 1490 may be permanently attached to the buccal-facing surface of the polymeric shell appliance 1475. In some embodiments, the aligner bridge may be attached to the teeth 1480, 1485, for instance with epoxy and the polymeric shell appliance 1475 fitted over the aligner bridge 1470 and teeth.

Figure 14C:
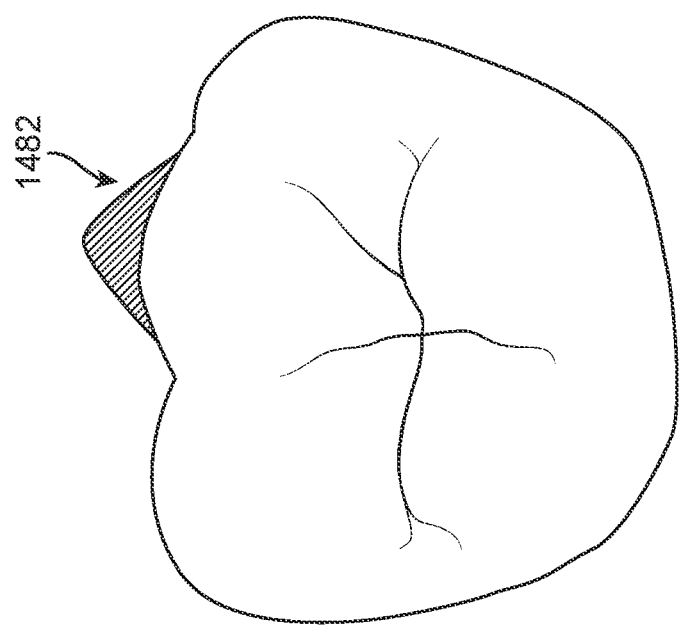
FIG. 14C illustrates expansion support attachment location, in accordance with one or more embodiments herein.
Figure 14C:
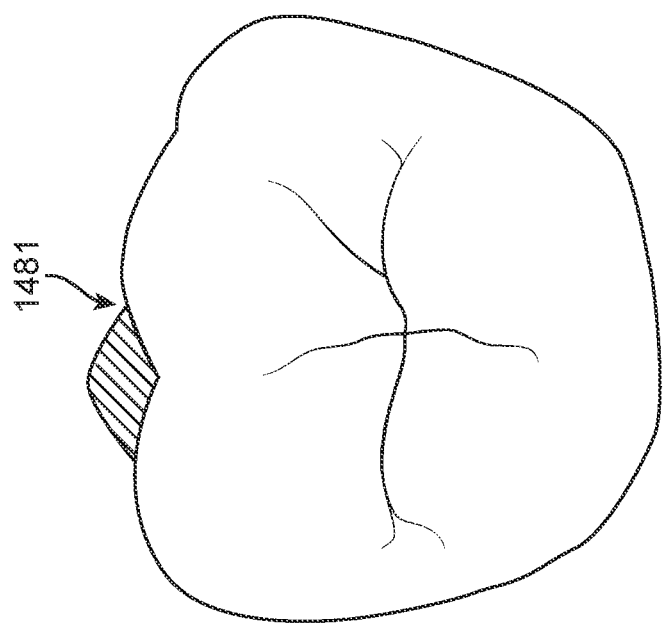

Referring now to FIG. 14C, arch expansion support attachments 1481, 1482 are shown on teeth of a patient. Placement depends on the surface of the tooth. To determine placement of an arch expansion support attachments 1481, 1482 first, the attachment size is scaled to fit the available tooth surface. In some embodiments the attachment covers more than 70% of the lingual surface of the crown of the tooth. In some embodiments the attachment covers more than 5%, 10%, 15%, 20%, 30%, 40%, 50%, or 60% or between any two of 5%, 10%, 15%, 20%, 30%, 40%, 50%, 60%, and 70% of the lingual surface of the crown of the tooth. Next, the position of the attachment is determined such that the attachment is not placed over grooves of the tooth, such as the buccal groove. I some embodiments, Grooves are detected and avoided because they reduce the effective prominence of the attachment.

In some embodiments the attachment may be placed over a groove. In such embodiments, to compensate for the groove prominence loss the attachment may be to fit to a convex surface to the crown where the attachment is to be placed. The points underneath the convex surface, and between the convex surface and the tooth could then be added to the attachment volume.

The arch expansion support attachments 1481, 1482 engage corresponding divots in the aligner bridge 1490 and provide an increased surface normal for engaging with the aligner bridge 1490. The arch expansion support attachments 1481, 1482 also provide for increased engagement between the teeth and the aligner bridge and allow increased forces to be applied to the teeth as compared to an aligner bridge engaged to the teeth without such attachments 1481, 1482.

What is claimed is:

1. An orthodontic appliance comprising:
    a polymeric shell shaped to fit over an arch of a patient's teeth and including a plurality of teeth receiving cavities comprising a lingual wall, a buccal wall, an occlusal wall extending between and connecting the lingual wall and the buccal wall;
    wherein the polymeric shell is shaped to impart an arch expansion force onto a tooth of the patient's teeth to move the tooth from a first position a first distance from a midline of the arch of the patient's teeth to a second position a second distance from midline of the arch of the patient's teeth, the second distance being greater than the first distance; and
    wherein at least one of the plurality of teeth receiving cavities includes an occlusal cusp portion on the occlusal wall, the occlusal cusp portion having a tooth facing surface shape4 configured to interfere with an occlusal cusp of the tooth when the polymeric shell is worn on the arch of the patient's teeth, wherein the occlusal cusp portion is configured to impart an anti-tipping moment onto the tooth, the anti-tipping moment being of a magnitude and direction to counteract a tipping movement associated with the arch expansion force; and
    a lingual bar on a lingual surface of the lingual wall of the polymeric shell and extending laterally along the lingual surface of the lingual wall, wherein the lingual bar is configured to extend across the midline of the arch of the patient's teeth, the lingual bar shaped to increase the arch expansion force on the patient's teeth applied by the polymeric shell.

2. The orthodontic appliance of claim 1, wherein the lingual bar is embedded in the lingual wall of the polymeric shell.

3. The orthodontic appliance of claim 1, wherein the lingual bar extends from a first canine tooth receiving cavity to a second canine tooth receiving cavity.

4. The orthodontic appliance of claim 1, further comprising:
    an arch feature located on the lingual wall, the arch feature extending from the lingual wall in an occlusal direction and having an occlusal surface configured to contact an occlusal surface of an opposing arch feature located on an opposing orthodontic appliance shaped to fit over an opposing arch of the patient.

5. The orthodontic appliance of claim 4, wherein the occlusal surface of the arch feature extends in the occlusal direction beyond an occlusal plane of the polymeric shell.

6. The orthodontic appliance of claim 4, wherein the arch feature extends in the occlusal direction beyond an occlusal plane of the polymeric shell.

7. The orthodontic appliance of claim 4, wherein the arch feature extends in the occlusal direction to an occlusal plane of the polymeric shell.

8. The orthodontic appliance of claim 4, wherein the arch feature is integrally formed with the polymeric shell.

9. The orthodontic appliance of claim 4, wherein the arch feature is coupled to the polymeric shell.

10. The orthodontic appliance of claim 1, wherein the polymeric shell is shaped to impart the arch expansion force onto a lingual side of the tooth.

11. The orthodontic appliance of claim 1, wherein the tooth facing surface shape of the occlusal cusp portion has a flatter geometry than the geometry of the occlusal cusp of the tooth.

12. The orthodontic appliance of claim 1, wherein the occlusal cusp portion is part of a posterior tooth receiving cavity that is shaped to receive a premolar or molar tooth.

13. The orthodontic appliance of claim 1, wherein the lingual bar extends laterally across anterior tooth receiving cavities shaped to receive anterior teeth and does not extend laterally across posterior tooth receiving cavities shaped to receive premolar and molar teeth.

14. The orthodontic appliance of claim 1, wherein the polymer shell and the lingual bar are made of thermoplastic material.

15. An orthodontic appliance comprising:
a polymeric shell shaped to fit over an arch of a patient's teeth and including a plurality of teeth receiving cavities comprising a lingual wall, a buccal wall, an occlusal wall extending between and connecting the lingual wall and the buccal wall, wherein the polymeric shell is shaped to impart an arch expansion force onto a tooth of the patient's teeth to move the tooth from a first location a first distance from a midline of the arch of the patient's teeth to a second position a second distance from midline of the arch of the patient's teeth, the second distance being greater than the first distance; and
wherein at least one of the plurality of teeth receiving cavities comprises an occlusal cusp portion on the occlusal wall, the occlusal cusp portion having a tooth facing surface shape configured to interfere with an occlusal cusp of the tooth when the polymeric shell is worn on the arch of the patient's teeth, wherein the occlusal cusp portion is configured to impart an anti-tipping moment onto the occlusal cusp of the tooth, the anti-tipping moment being of a magnitude and direction to counteract a tipping movement associated with the arch expansion force; and
a lingual bar on a lingual surface of the lingual wall of the polymeric shell and extending laterally across anterior tooth receiving cavities shaped to receive anterior teeth and does not extend laterally across posterior tooth receiving cavities shaped to receive premolar and molar teeth, wherein the lingual bar is configured to extend across the midline of the arch of the patient's teeth, the lingual bar shaped to increase the arch expansion force applied to the patient's teeth by the polymeric shell.

16. The orthodontic appliance of claim 15, wherein the anti-tipping moment is distributed on the occlusal cusp.

17. The orthodontic appliance of claim 15, wherein the anti-tipping moment is applied to a point on the occlusal cusp.

18. The orthodontic appliance of claim 15, wherein the at least one of the plurality of teeth receiving cavities further comprises an unactivated shape.

19. The orthodontic appliance of claim 18, wherein the unactivated shape is shaped to match a geometry of a portion of an occlusal surface of the tooth.

20. The orthodontic appliance of claim 15, wherein when the orthodontic appliance is worn by the patient, the occlusal cusp of the tooth pushes against the occlusal cusp portion and deforms the orthodontic appliance.

21. The orthodontic appliance of claim 20, wherein the deformed orthodontic appliance imparts the anti-tipping moment.

* * * * *